United States Patent
Oishi

(10) Patent No.: US 6,894,872 B2
(45) Date of Patent: May 17, 2005

(54) DISK CARTRIDGE HAVING SHUTTER OPERATION PORTIONS WHICH DO NOT OBSTRUCT ACCESS TO A MEDIUM WHETHER SHUTTER MEMBERS ARE AT A CLOSED POSITION OR AN OPEN POSITION

(75) Inventor: Kengo Oishi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 134 days.

(21) Appl. No.: 10/231,255

(22) Filed: Aug. 30, 2002

(65) Prior Publication Data

US 2003/0043507 A1 Mar. 6, 2003

(30) Foreign Application Priority Data

Sep. 3, 2001 (JP) ........................................ 2001-265429

(51) Int. Cl.⁷ .............................................. G11B 23/03
(52) U.S. Cl. ......................... 360/133; 720/738; 720/739
(58) Field of Search ............................. 360/133, 99.06; 720/738, 739

(56) References Cited

U.S. PATENT DOCUMENTS

| | | | | |
|---|---|---|---|---|
| 4,695,911 A | * | 9/1987 | Loosen ........................ | 360/133 |
| 5,671,212 A | * | 9/1997 | Miyazaki et al. ........... | 720/738 |
| 5,850,384 A | * | 12/1998 | Ohmori et al. .............. | 369/291 |
| 5,903,542 A | * | 5/1999 | Sandell et al. .............. | 369/291 |
| 6,243,355 B1 | * | 6/2001 | Ikebe et al. ................. | 369/291 |
| 6,577,592 B1 | * | 6/2003 | Takahashi ................... | 369/291 |
| 2003/0142442 A1 | * | 7/2003 | Kobayashi et al. ......... | 360/133 |
| 2003/0142443 A1 | * | 7/2003 | Kobayashi et al. ......... | 360/133 |
| 2003/0185145 A1 | * | 10/2003 | Roberts et al. ............. | 369/291 |
| 2003/0206372 A1 | * | 11/2003 | Warmenhoven ............ | 360/133 |

FOREIGN PATENT DOCUMENTS

JP 10-241316 A * 9/1998

* cited by examiner

Primary Examiner—Jefferson Evans
(74) Attorney, Agent, or Firm—Sughrue Mion, PLLC

(57) ABSTRACT

A shutter opening/closing member of a drive device, which slides a shutter and opens and closes a window portion, does not interfere with a recording/playback head. A shutter operation portion extends, in a sliding direction of the shutter, from a main body portion of the shutter which moves at a region of the window portion. When a disk cartridge is inserted into the drive device, a shutter opening/closing pin member of the drive device operates the shutter operation portion and makes the shutter slide. Both when the shutter has closed the window portion and when the shutter has opened the window portion, the shutter operation portion is positioned outside of the region of the window portion. Thus, the shutter opening/closing pin does not encroach on the region of the window portion, and does not interfere with the recording/playback head.

9 Claims, 18 Drawing Sheets

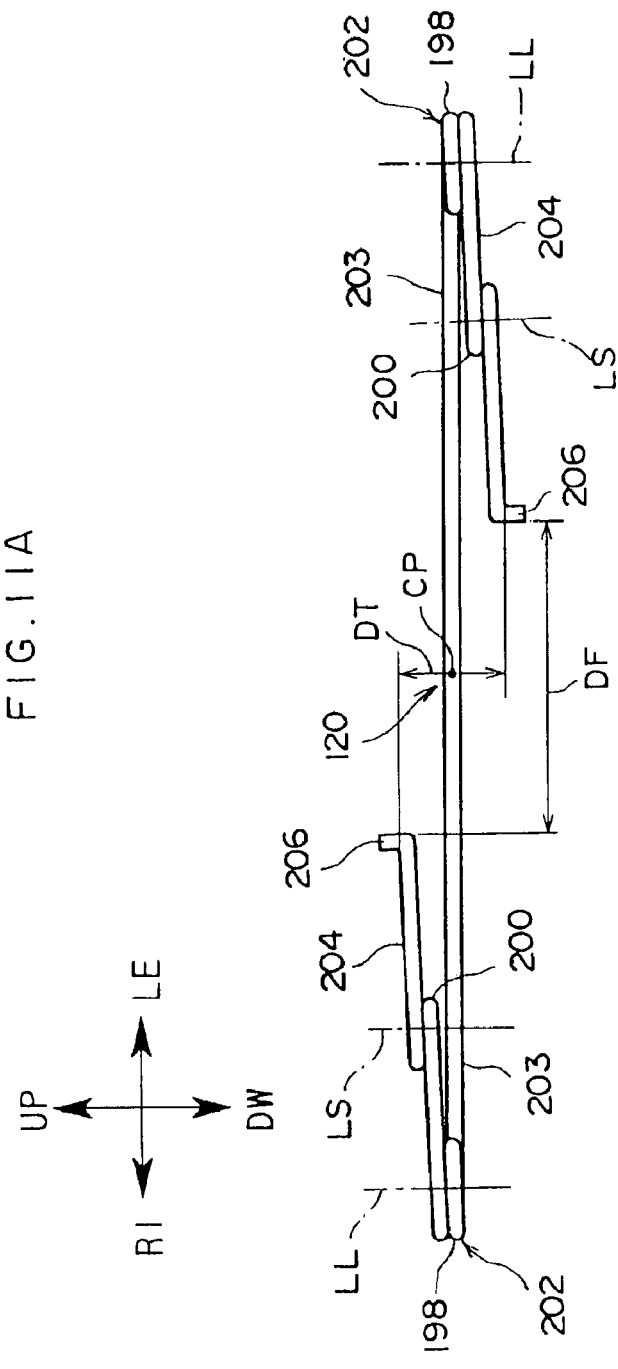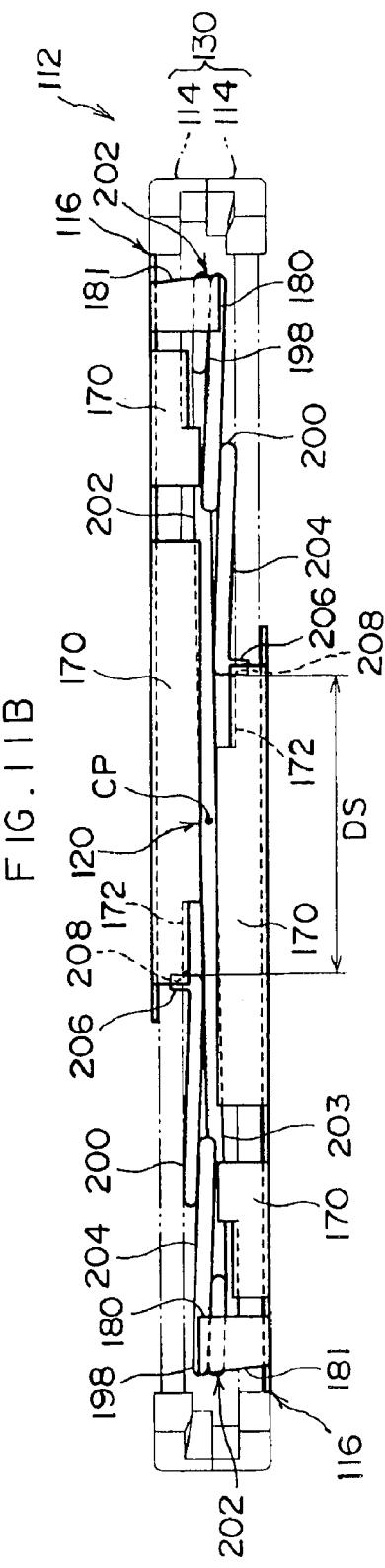

DISK CARTRIDGE HAVING SHUTTER OPERATION PORTIONS WHICH DO NOT OBSTRUCT ACCESS TO A MEDIUM WHETHER SHUTTER MEMBERS ARE AT A CLOSED POSITION OR AN OPEN POSITION

BACKGROUND OF THE INVENTION

1. Field of the Invention

The present invention relates to a disk cartridge which accommodates, in the interior thereof, a recording disk for recording of information.

2. Description of the Related Art (Prior Art 1)

With disk cartridges for the recording and playback of digital information such as characters, graphics or the like, there is the concern that the disk cartridge may malfunction due to dust or dirt or the like adhering to the surface of the recording disk. Thus, the disk cartridge is provided with a shutter which shields a window portion which is for a recording/playback head or a spindle to access the recording disk.

Usually, the shutter opens and closes the window portion by being slid in the direction orthogonal to the direction of insertion of the disk cartridge. This sliding of the shutter is realized as follows: after the disk cartridge is inserted into a drive device, when the disk cartridge sinks therein, a shutter opening/closing member of the drive device catches on a shutter operation portion of the shutter, and slides the shutter in the opening direction or the closing direction.

In an ultra-compact disk cartridge such as DataPlay (which is the commercial name of a product), the recording/playback head of the drive is relatively large as compared with the size of the shell. Thus, when, due to the opening operation of the shutter, the shutter opening/closing member provided at the drive device approaches the window portion region of the shell, there is the concern that the shutter opening/closing member will advance into the region of operation of the recording/playback head.

In order to overcome this problem, a structure has been conceived of in which the shutter operation portion is provided in a vicinity of the window portion region of the shutter. As the shutter slides, the shutter opening/closing member, together with the shutter operation portion, withdraws from the window portion region of the shell. However, here, there is the possibility that, in the initial stages of opening of the shutter, the shutter opening/closing member will interfere with the recording/playback head.

In this way, in the conventional shutter structure, there is the possibility that the shutter opening/closing member will advance into the region of operation of the recording/playback head (i.e., the window portion region).

(Prior Art 2)

In disk cartridges such as 3.5-inch flexible disks (FDs), mini-disks (MDs) and the like, a recording disk which is an information recording medium is accommodated within a cartridge case. At the time of reading or recording information from or onto the recording disk, the recording portion or the reading portion at a disk drive device (hereinafter, "drive device") can access the recording disk from a window portion of the cartridge case. Further, a shutter member is provided at the cartridge case. If the disk cartridge is not loaded in a drive device, the shutter member is at a closed position, and closes the window portion. As needed, the shutter member is driven by a shutter opening/closing mechanism of the drive device, so as to reach an open position, and the window portion is opened. There are shutter opening/closing mechanisms of drive devices which, for example, open and close a shutter member by engaging a shutter opening/closing lever, which is formed in a pin-shape or a plate-shape, with the shutter member, and moving the shutter opening/closing lever along the opening/closing direction of the shutter member.

In recent years, the development of small-sized disk cartridges has advanced as such small-sized disk cartridges are utilized in mobile devices such as cellular phones and the like. The cartridge case of such a disk cartridge is of course also made smaller-sized. Thus, there is a strong need to reduce the size of the parts and decrease the number of the parts accommodated within the cartridge case. Further, in order to make the information storage amount per recording disk as large as possible, there are cases in which both obverse and reverse surfaces of the recording disk must be used as information recording surfaces. In such a disk cartridge, usually, a window portion is formed in each of the obverse and reverse surfaces of the cartridge case. Shutter members, which open and close the window portions, are provided at the obverse surface side and the reverse surface side of the cartridge case. Accordingly, there is the need to provide spring members, which urge the pair of shutter members toward their respective closed positions, within the cartridge case in order to prevent the pair of shutter members from erroneously opening, and in order to return the shutter members, which are at their open positions, to their closed positions when the disk cartridge is discharged from the drive device.

However, if a pair of independent spring members for urging the pair of shutter members to the closed positions are provided within the cartridge case, the spring members must be made extremely small. Manufacturing of such small-sized spring members is difficult, and the manufacturing costs thereof are high. Moreover, the work for reliably assembling the small-sized spring members at predetermined positions within the cartridge case is difficult.

(Prior Art 3)

Conventionally, in 3.5-inch flexible disks (FDs), mini-disks (MDs) and the like, a disc-shaped disk medium is accommodated within a case. At the time of reading or recording information from or onto the disk medium, a recording member or a reading member of a drive device accesses the disk medium from an opening portion of the case. Further, a shutter member is provided at the case. In the usual state, the shutter member is at a closed position and closes the opening portion. As needed, the shutter member is moved by a drive device to reach an open position, and the opening portion is opened.

Here, in order to prevent the opening portion from being opened needlessly, it is preferable to provide a locking member, for locking the shutter member, at the case. However, for example, in a case corresponding to a disk medium at which information can be recorded at both sides thereof, shutter members are provided independently at the two opening portions of the obverse and reverse sides. Thus, if lock members are provided separately for these shutter members, the number of parts increases, which leads to an increase in the costs for parts.

Moreover, because the number of work processes for assembling parts increases due to the increase in the number of parts, the assembly costs also increase. In addition, in recent years, it has become desirable to make disk media smaller sized. When, in accordance with this trend, the respective parts are also to be made small-sized, the assembly work becomes even more difficult.

SUMMARY OF THE INVENTION

A first object of the present invention is to prevent a shutter opening/closing member of a drive device, which slides a shutter to open and close a window portion, from interfering with a recording/playback head.

Another object of the present invention is to provide a disk cartridge in which a pair of shutter members, which correspond to the obverse and reverse surfaces of a recording disk respectively, can be urged to their closed positions by a single spring member having a simple structure.

Yet another object of the present invention is to provide a disk cartridge in which two shutter members can respectively be reliably locked with a small number of parts, and in which, in particular, two shutter members can respectively be reliably locked with a small number of parts even if a disk medium is small-sized.

In order to achieve the above objects, in accordance with a first aspect of the present invention, there is provided a disk cartridge comprising: a medium; a pair of shells each having an access opening through which the medium can be accessed, and the pair of shells have substantially the same structure, and due to the pair of shells being superposed, a cartridge main body, which can accommodate the medium in an interior of the cartridge main body, is formed; and a pair of shutter members mounted correspondingly to the pair of shells, and able to move between an open position for opening the access opening and a closed position for closing the access opening, the pair of shutter members each having a shutter operation portion for externally operating the shutter member to move to the open position, wherein the shutter operation portion of each shutter member is positioned such that the shutter operation portion does not obstruct access to the medium via the access opening, whether the shutter member is positioned at the closed position or at the open position.

In the above-described structure, the shutter slides in directions orthogonal to the direction of insertion of the shells, and an access opening formed at the shell is opened or closed. In this way, a recording/playback head and a driving shaft at a drive device can access the recording disk.

The shutter operation portion of the shutter extends in the direction of sliding of the shutter, from the main body portion of the shutter which moves at the region of the access opening. When the shell is inserted into the drive device, the shutter opening/closing member of the drive device operates the shutter operation portion and makes the shutter slide.

Here, both when the shutter has closed the access opening and when the shutter is slid and has opened the access opening, the shutter operation portion is positioned at an outer side of the region of the access opening. In other words, the shutter opening/closing member as well is positioned at the outer side of the region of the access opening.

In this way, by making the position of the shutter operation portion be far from the region of the access opening, the shutter can be opened and closed without the shutter opening/closing member encroaching on the region of the access opening. Here, the region of the access opening encompasses the regions in air above and below the region defined by the edge portions of the access opening, and the horizontal region of the direction of insertion of the shell, and is the region of operation of the recording/playback head.

In accordance with another aspect of the present invention, there is provided a disk cartridge comprising: a medium; a pair of shell members each having an access opening through which the medium can be accessed, and the pair of shell members have substantially the same structure, and due to the pair of shell members being superposed, a cartridge main body, which can accommodate the medium in an interior of the cartridge main body, is formed; a pair of shutter members mounted correspondingly to the pair of shell members, and able to move between an open position for opening the access opening and a closed position for closing the access opening; and a spring member having a pair of urging arms, each urging arm always urging a corresponding shutter member to the closed position.

In accordance with yet another aspect of the present invention, there is provided a disk cartridge comprising: a medium; a pair of case members each having an access opening through which the medium can be accessed, and the pair of case members have substantially the same structure, and due to the pair of case members being superposed, a cartridge main body, which can accommodate the medium in an interior of the cartridge main body, is formed; a pair of shutter members mounted correspondingly to the pair of case members, and able to move between an open position for opening the access opening and a closed position for closing the access opening; and a lock member having a pair of moving portions and an elastic portion elastically connecting the moving portions, and each moving portion is movable between an engaging position at which the moving portion engages with a corresponding shutter member at the closed position and fixes the corresponding shutter member, and a non-engaging position at which fixing is released, and the elastic portion always urges each moving portion to the engaging position.

BRIEF DESCRIPTION OF THE DRAWINGS

FIG. 11A is a front view showing the structure of a spring member relating to the second embodiment, and FIG. 11B is a diagram showing a state in which the spring member is accommodated within a cartridge case.

DESCRIPTION OF THE PREFERRED EMBODIMENTS (First Embodiment)

Hereinafter, a first embodiment of the present invention will be described with reference to the drawings.

Figure 1:
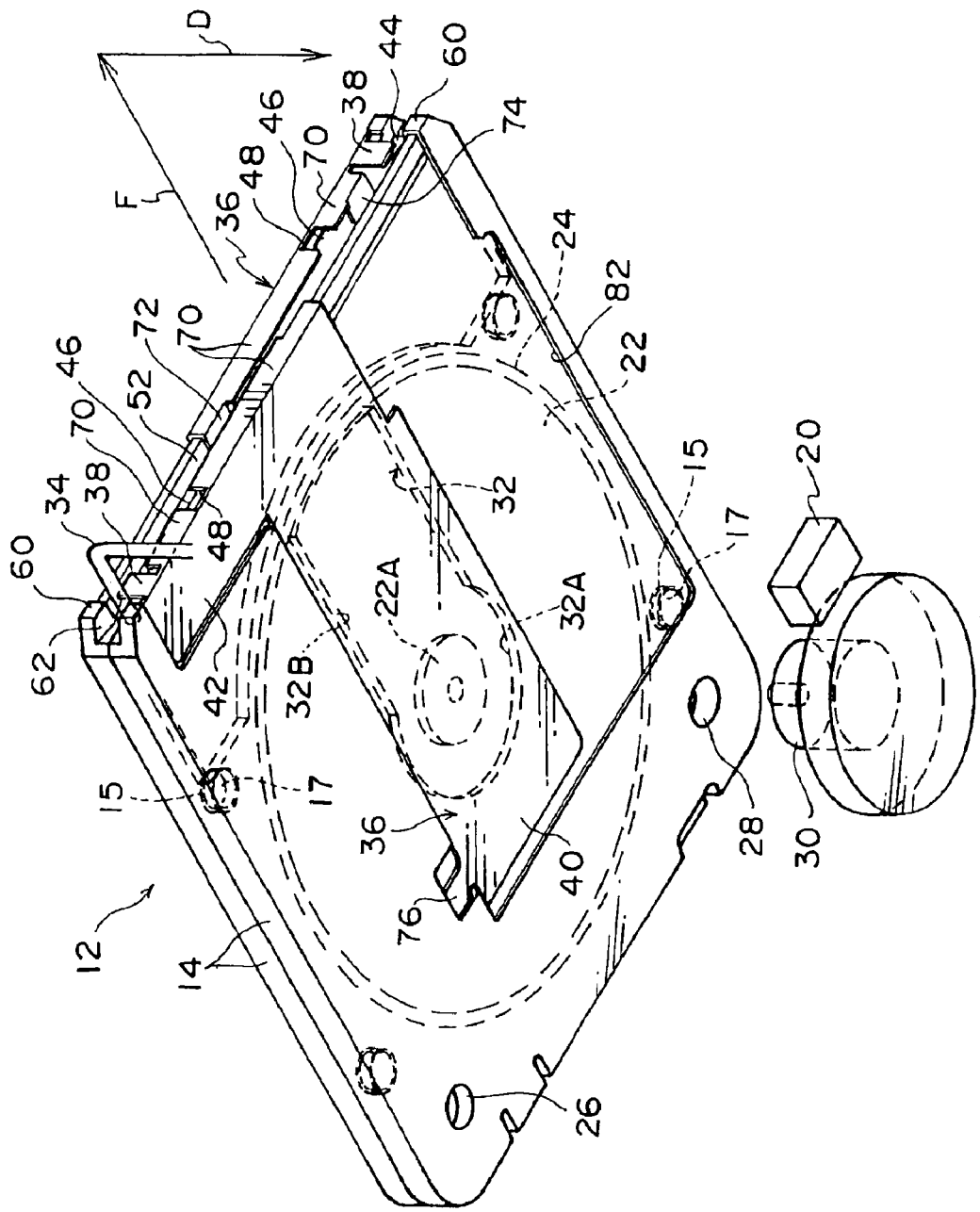
FIG. 1 is a perspective view showing the relationship between a shutter opening/closing pin and a disk cartridge of a first embodiment of the present invention.
Figure 2:
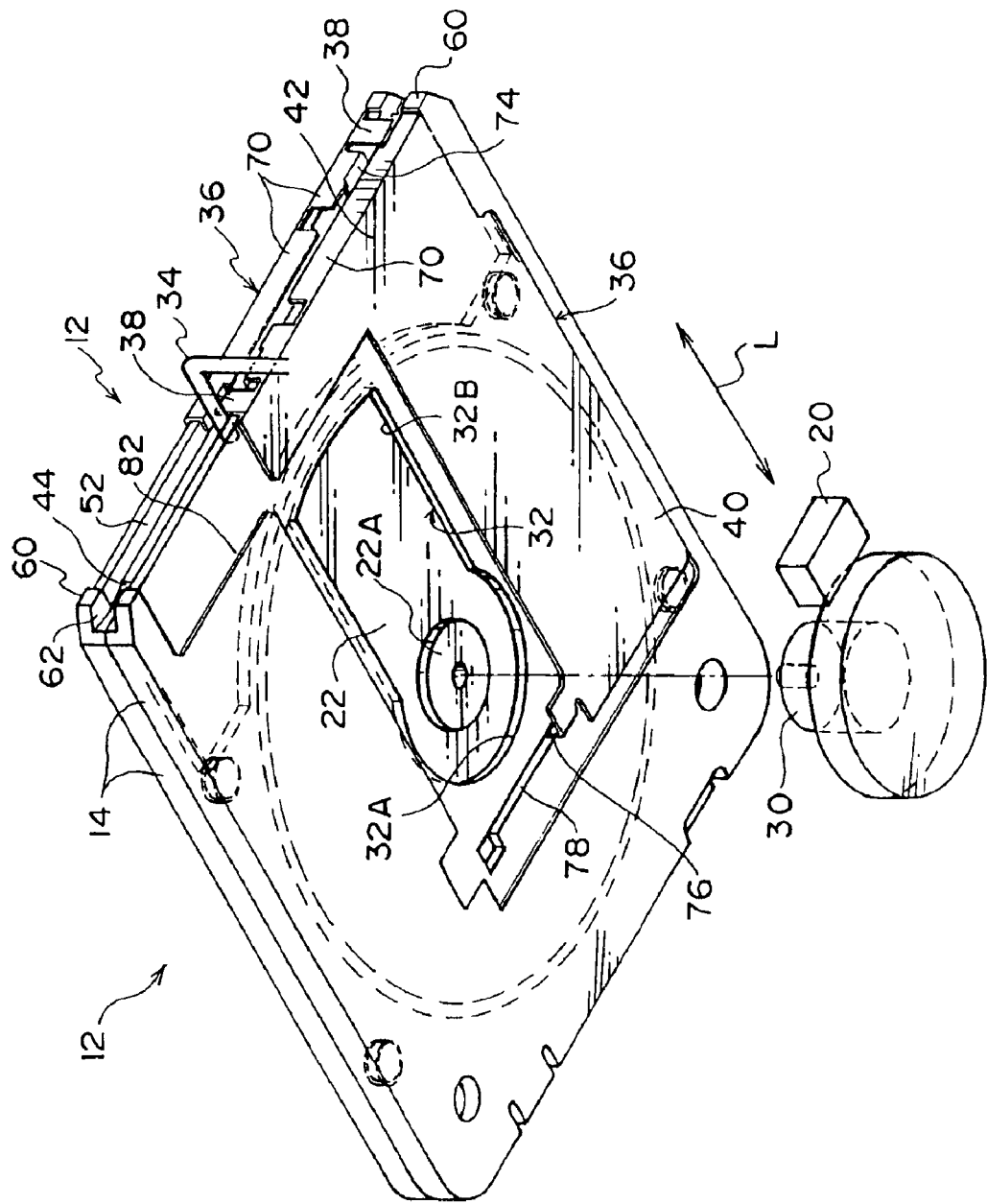
FIG. 2 is a perspective view showing the relationship between the shutter opening/closing pin and the disk cartridge of the first embodiment.

As shown in FIGS. 1 and 2, a disk cartridge 12 is formed by superposing two substantially rectangular shells 14. Projections 15 and fit-together holes 17 are formed at the inner surfaces of the shells 14. When the two shells 14 are superposed, the projections 15 and the fit-together holes 17 are fit together and joined together, and an accommodating space for a recording disk 22 is formed.

The shells 14 have substantially the same configuration, which results in lower manufacturing costs for the mold and ensures ease of assembly. The front-back dimension of the shells 14 (the dimension along the insertion direction F) is greater than their dimension along the left-right direction. Therefore, the disk cartridge cannot mistakenly be inserted into a drive device (not shown) from the left-right direction.

A circular hole 26 and an elongated hole 28 for positioning are formed in the shell 14 at predetermined positions thereof. Within the drive device, the positions, in the horizontal direction and the height wise direction, of the shell 14 with respect to a recording/playback head 20, which serves as a recording/playback means, are determined by reference pins (not shown) of the drive device being inserted into the circular holes 26 and the elongated holes 28.

A circumferential wall 24, which accommodates the disc-shaped recording disk 22, stands upright at the substantial center of the inner surface of the shell 14. The circumferential wall 24 holds the recording disk 22 rotatably, and prevents entry of dirt and dust.

A keyhole-shaped window portion 32 is formed in the shell 14. A circular portion 32A of the window portion 32 is concentric with the recording disk 22 which is accommodated. From this circular portion 32A, a spindle 30 holds and rotates a core portion 22A of the recording disk 22. An opening portion 32B for reading/writing, which is rectangular, is formed continuously from the circular portion 32A so as to reach the circumferential wall 24. The recording/playback head 20 of the drive device accesses the recording surface of the recording disk 22 from the opening portion 32B for reading/writing, and reads information from or writes information onto the recording disk 22.

The front surface portion of the shell 14 is thinner than the other three sides of the shell 14, such that a guide groove 52 is formed along the front surface portions of the shells 14 when the shells 14 are superposed. A shutter opening/closing pin 34 of the drive device is inserted into and slides within the guide groove 52.

Convex portions 60 project into the guide groove 52 at the entrance of the guide groove 52 (the left end portion of the guide groove 52), such that the entrance to the guide groove 52 is substantially narrowed. Taper surfaces 62 are formed at the guide groove 52 sides of the convex portions 60. The taper surfaces 62 guide the shutter opening/closing pin 34 such that proximal end sides of shutter operation portions 38 of shutters 36 which will be described later are pushed from the center of the guide groove 52.

The two shutters 36, which have the same configurations and which move independently, are disposed at the outer surfaces of the shells 14, respectively. Each shutter 36 is formed in a substantial L-shape and has a shutter main body portion 40 of a size which can close at least the window portion 32, and a shutter guide portion 42 which extends from the front side of the shutter main body portion 40.

Contact pieces 70, which rise at a substantially right angle from the shutter guide portion 42, are provided erect thereat. Two guide pieces 72, 74, which are parallel to the shutter guide portion 42, are formed at the end portions of the contact pieces 70. When the shutter 36 is disposed at a predetermined position of the shell 14, the contact pieces 70 and the guide pieces 72, 74 nip the front surface portion of the shell 14 such that the shutter 36 does not inadvertently fall off or joggle.

A guide piece 76, which extends in the same direction as the shutter guide portion 42 and whose distal end is bent parallel to the shutter main body portion 40, is formed in a vicinity of the rear end of the shutter main body portion 40.

A guide hole 78 is formed in the left-right direction at the rear of the window portion 32 in the shell 14. The guide piece 76 is inserted into the guide hole 78. Inadvertent falling-off and joggling of the shutter 36 from the shell 14 is prevented by this guide piece 76 as well.

A concave portion 82 is formed in the outer surface of the shell 14, at a region of movement of the shutter 36 and in accordance with the thickness of the shutter 36. The surface of the shutter 36 and the surface of the shell 14 are flush with one another.

The shutter operation portion 38 stands erect at a vicinity of the distal end of the shutter guide portion 42 of the shutter 36, i.e., at the side edge portion of the shell 14 at the final end in the direction of sliding of the shutter 36. The length by which the shutter operation portion 38 projects is longer than the length by which the contact pieces 70 project, such that the distal end portion of the shutter operation portion 38 passes over the center of the guide groove 52. Accordingly, when the shutter opening/closing pin 34 is moved within the guide groove 52, the shutter opening/closing pin 34 contacts the proximal side of the shutter operation portion 38, and slides the shutter 36 without sliding out.

One lock member is disposed between the two shells 14. The lock member has a configuration which has line symmetry, and swings around a rotating portion. When a lock releasing piece 44, which is formed at the free end portion side of the lock member, is pushed toward the shell 14 by the distal end of the shutter opening/closing pin 34, the lock member swings around the rotating portion, and lock pieces 46 move apart from lock portions 48 of the shutter 36, such that locking of the shutter 36 is cancelled, and the shutter 36 can slide. Further, when the pushed state of the lock releasing piece 44 is cancelled, the lock member swings around the rotating portion due to elastic force, and the lock pieces 46 again anchor the lock portions 48 of the shutter 36.

One spring member (not illustrated) is disposed between the shells 14 so as to span the widthwise direction length of the front surface portion of the shell 14. The spring member is formed by processing a single wire, and is formed from a rectilinear portion spanning the widthwise direction of the shell 14, and a total of four loop portions which are a large loop portion and a small loop portion formed at each end of the rectilinear portion.

Hook portions, which are folded over substantially at right angles, are formed at the final end portions of the spring member, and are connected to spring receiving portions which are notched out in the guiding pieces 72 of the shutters 36. When an attempt is made to move the shutter 36 in the opening direction, the hook portion is pressed by the spring receiving portion such that the spring member deforms, and the spring member exhibits a large elastic force which urges the shutter 36 in the closing direction.

The disk cartridge 12 of the present embodiment is such that both sides thereof have the same configuration, such that, if the disk cartridge 12 is loaded into a drive device upside-down, both recording surfaces of the recording disk 22 can be accessed from the both surfaces of the shells 14, and information can be written onto or read from the both recording surfaces of the recording disk 22.

The upper and lower shells 14 have the same configurations, the shutters 36 have the same configurations, and one lock member and one spring member are provided for the two shells 14 and the two shutters 36. Accordingly, as compared with a case in which the shells or the shutters have respectively different configurations, or a case in which a lock member and a spring member are provided for each of the two shells and shutters, the number of parts is reduced, management of the number of parts is facilitated, and the parts costs can be reduced.

Next, operation of the disk cartridge 12 will be described.

When the disk cartridge 12 is loaded into the drive device (inserted in the direction of arrow F), the disk cartridge 12 sinks-in in the direction of arrow D. The shutter opening/closing pin 34 is slid and enters into the guide groove 52 from a widthwise direction end portion of the disk cartridge 12. Because the shutter opening/closing pin 34 is disposed on an extension of the side edge portion of the shell 14, the shutter opening/closing pin 34 can be operated without interfering with the spindle 30 and the recording/playback head 20 which are at the region of the window portion.

While in the midst of entering into the guide groove 52, the shutter opening/closing pin 34 contacts the lock releasing piece 44 of the lock member, due to the taper surface 62 of the concave portion 60. When the shutter opening/closing pin 34 enters further into the guide groove 52, the lock releasing piece 44 is pressed, the lock member swings around the rotating portion, the lock pieces 46 move apart from the lock portions 48, and locking of the shutter 36 is released.

When the shutter opening/closing pin 34 advances even further into the guide groove 52, the shutter opening/closing pin 34 abuts the shutter operation portion 38 of the shutter 36, and pushes the shutter 36 toward the open position. In this way, while gradually elastically deforming the spring member, the shutter 36 slides toward the open position. When the shutter 36 reaches the open position, the window portion 32 is opened. Thus, the spindle 30, which serves as a driving shaft, accesses the recording disk 22 from the circular portion 32A, holds the recording disk 22, and rotates the recording disk 22. Further, the recording/playback head 20 accesses the recording disk 22 from the opening portion 32B for reading/writing, moves in the directions of arrow L, and writes information onto and reads information from the recording disk 22.

At the position where the window portion 32 is completely open, the shutter operation portion 38 of the shutter 36 is positioned at a region other than the region where the window portion 32 is disposed. Accordingly, because the shutter opening/closing pin 34 as well is positioned at a region other than the region of the window portion 32, the shutter opening/closing pin 34 does not encroach upon the region of operation of the recording/playback head 20.

This disk cartridge exhibits excellent effects in cases in which a small disk is employed as the recording disk 22, i.e., in cases in which the recording/playback head of the drive device is relatively large as compared with the size of the shell. For example, the disk cartridge is effective in a case in which the length of one side of the shell 14 is about 30 mm to 40 mm.

The recording disk 22 relating to the present invention is not particularly limited provided that information can be written thereon and read therefrom. For example, disks which can be utilized with any of various recording methods, such as the recording of information by light, the recording of information by magnetism, or the like, can be used as the recording disk 22.

The structure of the present invention can be applied as well to disk cartridges having a single recording/playback side and only one shutter, or disk cartridges having dual recording/playback sides and only one shutter.

Because the present invention is structured as described above, a shutter opening/closing member of a drive device, which slides a shutter so as to open and close a window portion, does not interfere with a recording/playback head.

(Second Embodiment)

A disk cartridge relating to a second embodiment of the present invention will be described hereinafter with reference to the drawings.

A disk cartridge 112 relating to the second embodiment of the present invention is shown in FIGS. 3 through 12. In these figures, arrows FR, RE, UP, DW, RI, and LE indicate, respectively, the front direction (the loading direction), the rear direction, the upward direction, the downward direction, the rightward direction, and the leftward direction of the disk cartridge 112, based on the direction of insertion of the disk cartridge 112 into the disk drive device.

Figure 4:
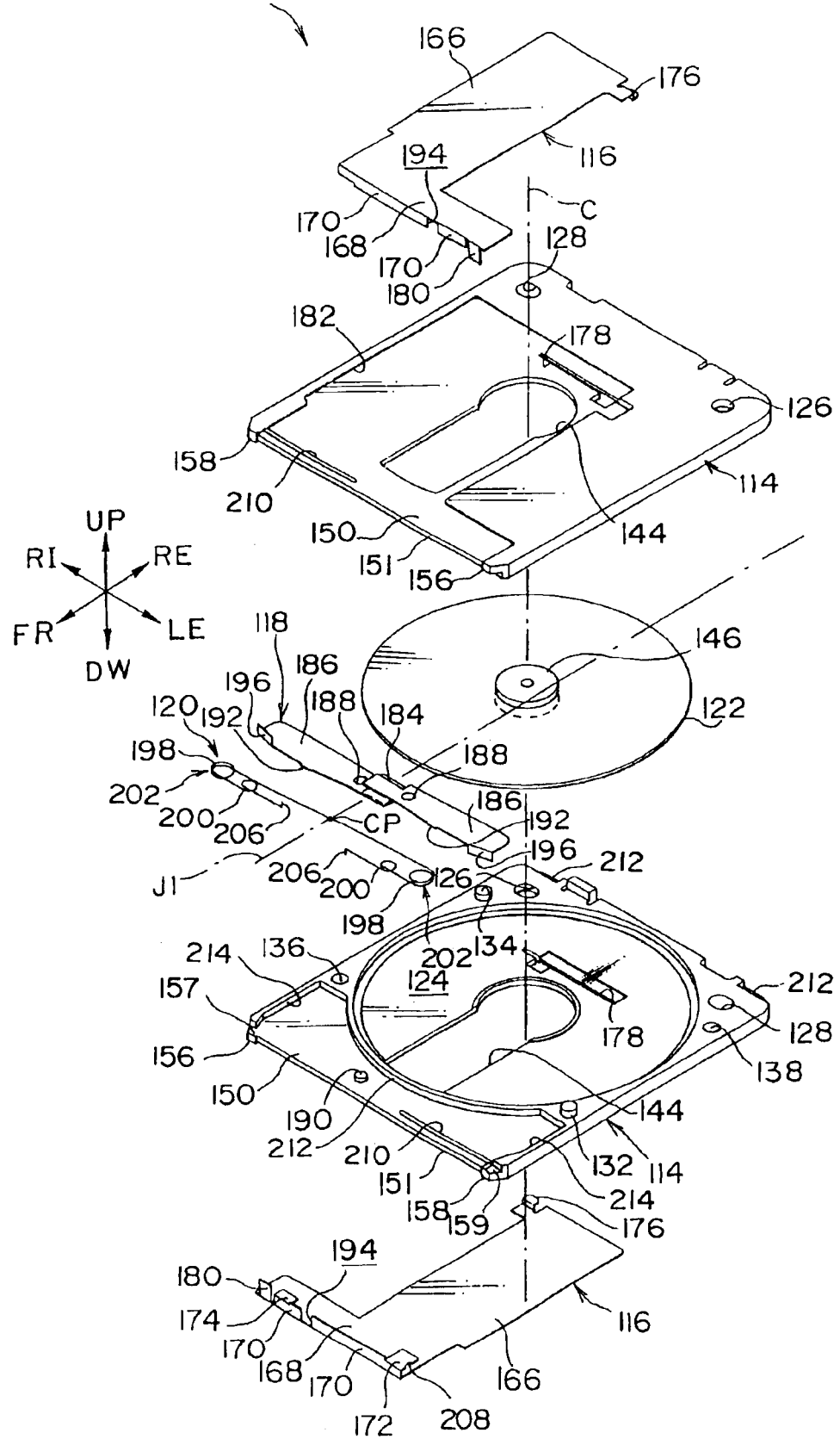
FIG. 4 is an exploded perspective view showing the structure of the disk cartridge relating to the second embodiment.

As shown in FIG. 4, the disk cartridge 112 has a pair of shell members 114, a pair of shutter members 116 provided so as to correspond to the shell members 114 respectively, and one lock member 118 and one spring member 120 which are provided in common for the pair of shutter members 116.

The pair of shell members 114 have the same configuration, and as seen in plan view, are each formed as a substantially rectangular plate shape. The front-back dimension of the shell member 114 is slightly greater than the left-right dimension thereof, such that the disk cartridge 112 cannot erroneously be inserted into a drive device along the widthwise direction (the left-right direction) thereof. A circular hole 126 and an elongated hole 128 for positioning are formed in predetermined positions of the shell member 114. Within the drive device, the disk cartridge 112 is positioned by reference pins (not shown) of the drive device being inserted into the circular holes 126 and the elongated holes 128.

Figure 3:
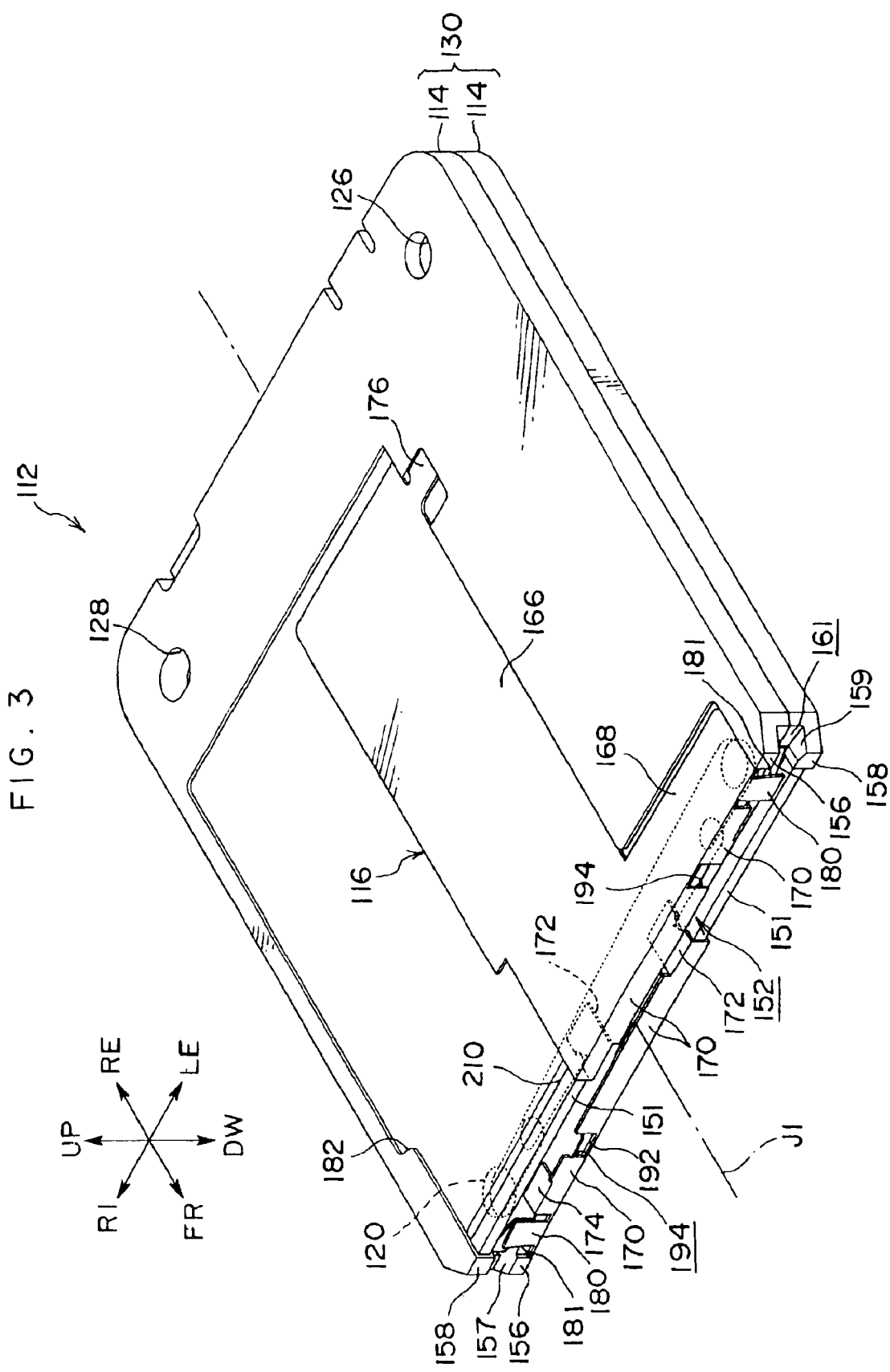
FIG. 3 is a perspective view showing the structure of a disk cartridge relating to a second embodiment of the present invention.

A disk accommodating portion 124, which corresponds to a disc-shaped recording disk 122, is formed at a position offset slightly toward the rear from the substantial center of the shell member 114. By superposing one shell member 114 on the other shell member 114 in a state in which the one shell member 114 is rotated (inverted) around axis of symmetry J1 with respect to the other shell member 114 such that the pair of disk accommodating portions 124 oppose one another, a cartridge case 130 which accommodates the recording disk 122 is formed as shown in FIG. 3. Further, as shown in FIG. 4, a pair of bosses 132, 134 stand erect at the inner surface of the shell member 114. Fit-together holes 136, 138, which correspond to the bosses 132, 124, are formed at positions which are symmetrical with respect to the axis of symmetry J1. When the corresponding bosses 132, 134 are fit together with the fit-together holes 136, 138 in the state in which the pair of shell members 114 are superposed, the superposed state of the shell members 114 is maintained, and the shell members 114 cannot be inadvertently separated from one another.

A window portion 144, for access to the recording disk 122, is formed in the shell member 114. In the state in which the disk cartridge 112 is loaded in a drive device, a spindle of the drive device is inserted into the cartridge case 130 through the window portion 144 and is connected to a center hub 146 of the recording disk 122, and a recording/playback head of the drive device can access the recording disk 122. Note that, in the disk cartridge 112 relating to the present embodiment, both obverse and reverse surfaces of the recording disk 122 are recording surfaces onto which information can be recorded and from which information can be played back.

A thin portion 150, which is locally thin from the inner surface side toward the outer surface side, is formed in the central portion of the front edge side of the shell member 114. As shown in FIG. 3, when the pair of shell members 114 are superposed so as to form the cartridge case 130, a slit-shaped insertion opening 152, which extends along the widthwise direction, is formed in the front end surface of the cartridge case 130, and a spring accommodating portion 154 is formed at the inner side of the insertion opening 152. The spring member 120 (see FIG. 4), which is formed from a metal wire, is accommodated within the spring accommodating portion 154.

As shown in FIG. 3, guiding convex portions 156, 158, which project slightly further forward than the thin portion 150, are formed at the both end portions of the front edge side of the shell member 114. Among these guiding convex portions 156, 158, the one guiding convex portion 156 is formed to be slightly thicker than the thin portion 150. A guide surface 157, which is the inner side surface of the guiding convex portion 156 along the direction of thickness thereof, is planar. A guide surface 159 is formed at the other guiding convex portion 158 of the shell member 114. The guide surface 159 is inclined from the widthwise direction outer side end portion toward the inner side end portion, so as to approach the guiding convex portion 156 of the other shell member 114.

A guide groove 160, which extends from the end portion at the front end surface of the cartridge case 130 toward the center, is formed between the opposing guide surface 157 and guide surface 159 at the cartridge case 130. A widthwise direction outer side open end 161 of the guide groove 160 is an entrance/exit for an opening/closing lever 228 of the drive device which will be described later. A widthwise direction inner side end portion of the open end 161 communicates with the insertion opening 152.

As shown in FIG. 4, the shutter members 116, which are formed in thin plate shapes, are disposed at the outer surfaces of the pair of shell members 114 which form the cartridge case 130. The shutter member 116 is formed in a substantial L-shape having a shutter main body portion 166 of a size which can close the window portion 144, and a shutter guide portion 168 which extends from the front end portion of the shutter main body portion 166. Contact pieces 170, which rise at a substantially right angle, stand erect at the shutter guide portion 168. Two guide pieces 172, 174 are formed parallel to the shutter guide portion 168, at end portions of the contact pieces 170. When the shutter member 116 is disposed at a predetermined position of the shell member 114, the contact pieces 170 contact a front edge portion 151 of the thin portion 150 of the of the shell member 114, and the guide pieces 172, 174 oppose the thin portion 150 at the opposite side of the shutter guide portion 168. In this way, the shutter member 116 can be prevented from falling off from or joggling at the shell member 114.

Figure 12:
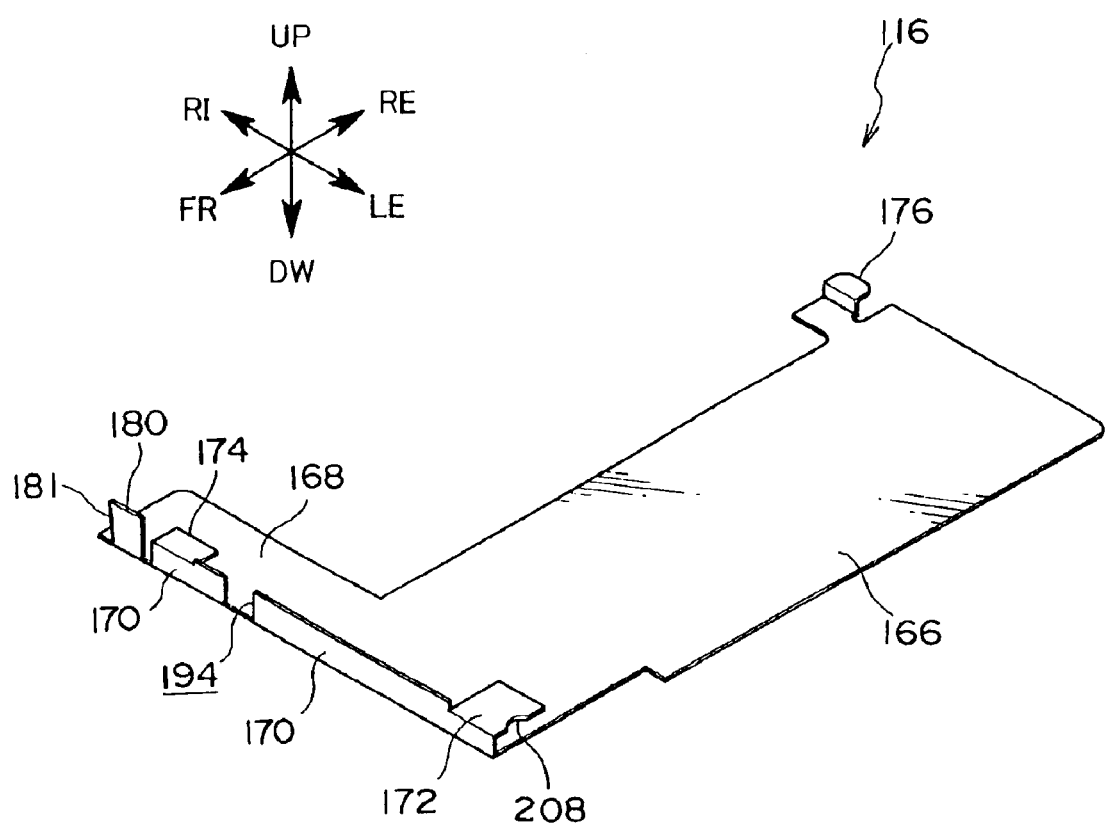
FIG. 12 is a perspective view showing the structure of the shutter member in the disk cartridge relating to the second embodiment.

As shown in FIG. 4, a guide piece 176 is formed at a vicinity of the rear end of the shutter main body portion 166 (see FIG. 12). The guide piece 176 extends in the same direction as the shutter guide portion 168, and rises up at a right angle with respect to the shutter main body portion 166. The distal end of the guide piece 176 is bent parallel to the shutter main body portion 166. A guide hole 178, which passes through the shutter member 116 in the thickness direction thereof and extends along the widthwise direction thereof, is formed in the shutter member 116. The guide piece 176 is inserted into the guide hole 178 (see FIG. 3). In this way as well, the shutter member 116 can be prevented from falling off from or joggling at the shell member 114.

Figure 6:
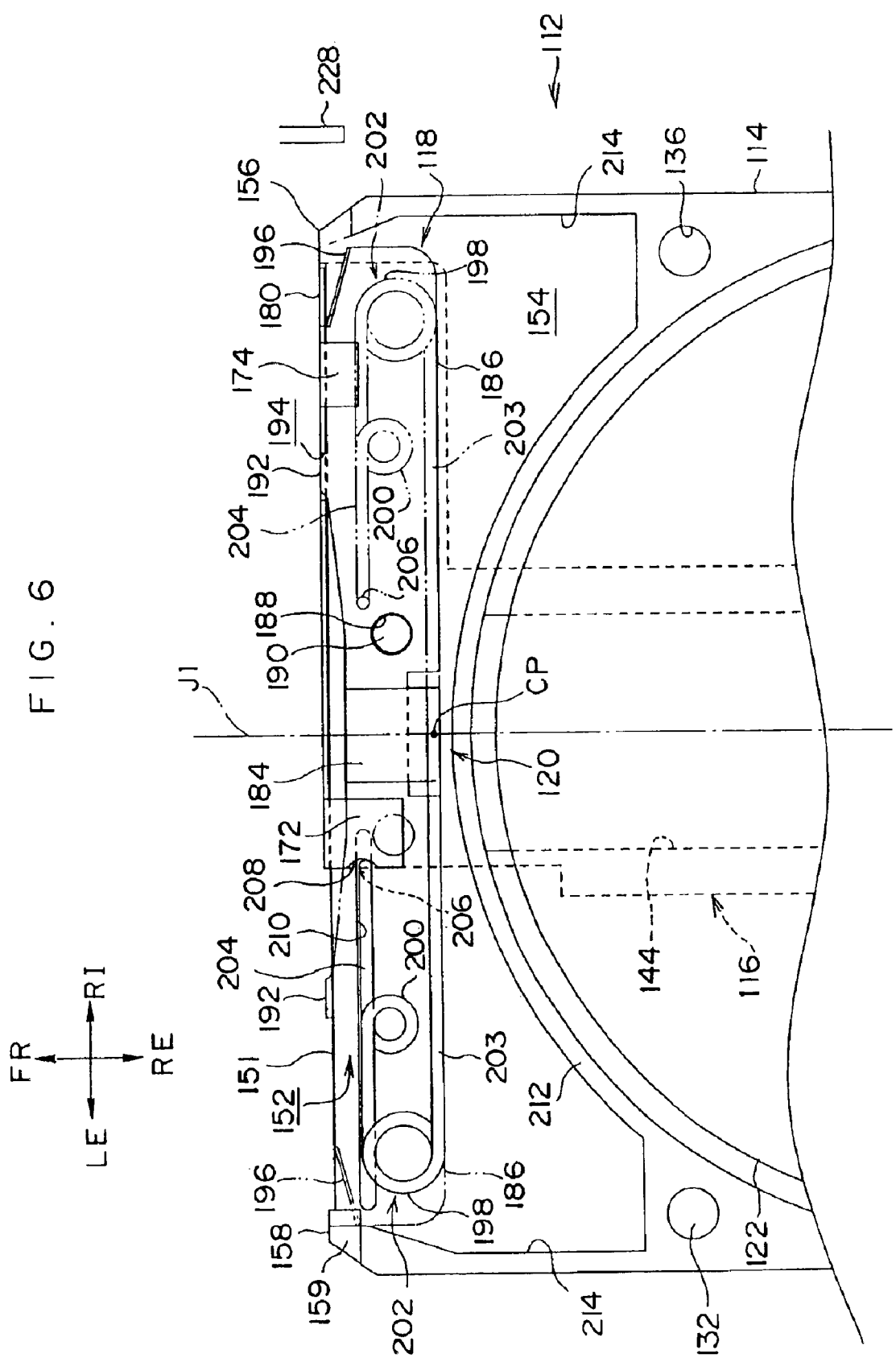
FIG. 6 is a plan view showing an opening/closing lever and a vicinity of the leading end portion of the disk cartridge relating to the second embodiment, and shows a state in which the opening/closing lever is at a standby position.
Figure 10:
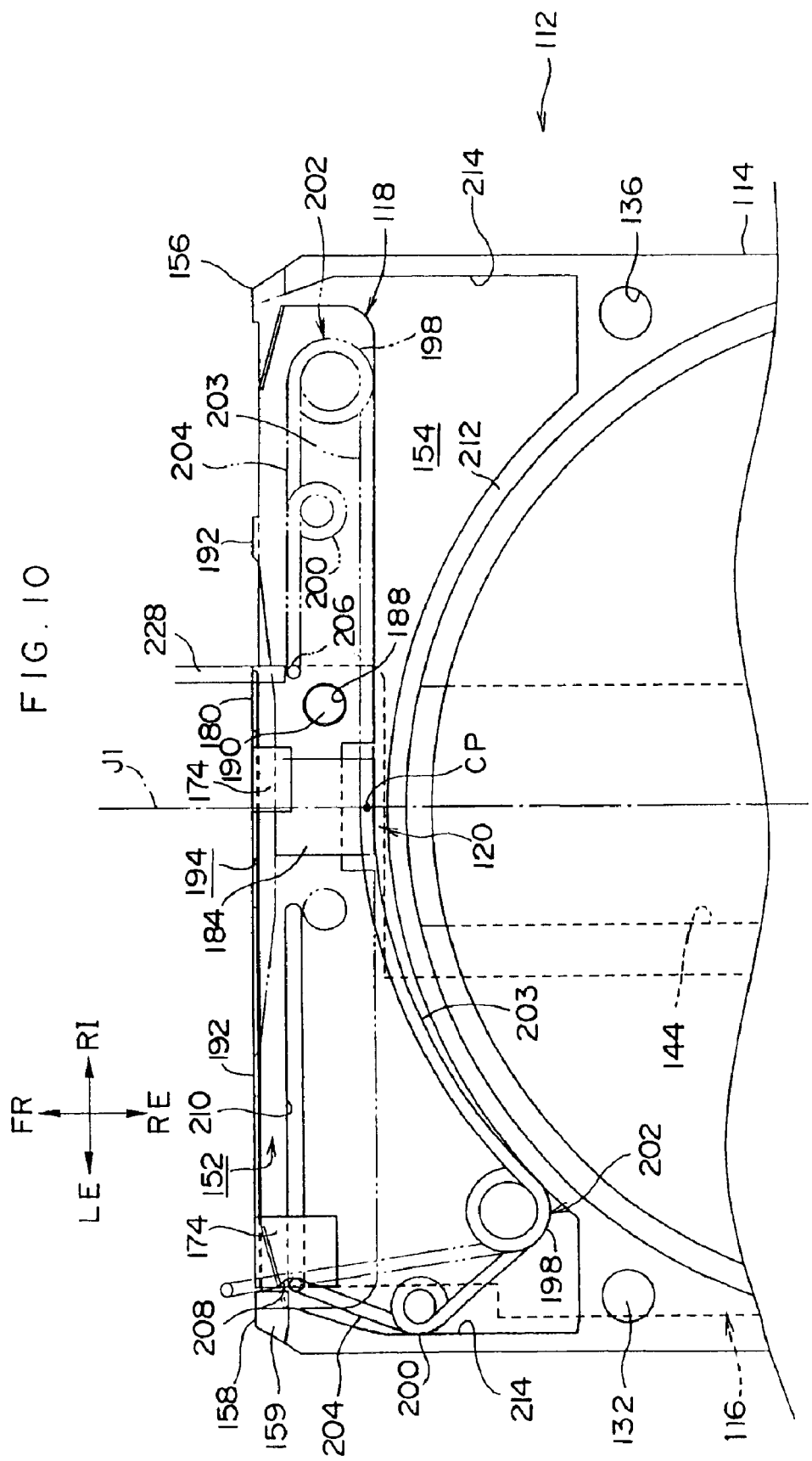
FIG. 10 is a plan view showing the opening/closing lever and the vicinity of the leading end portion of the disk cartridge relating to the second embodiment, and shows a state in which the shutter member has been moved to the open position by the opening/closing lever.

The shutter member 116 can slide while being guided by the guide pieces 172, 174, 176, from the position shown in FIG. 6 at which the shutter main body portion 166 closes the window portion 144 of the shell member 114 (closed position), to the position shown in FIG. 10 at which the window portion 144 is completely open. Note that a concave portion 182, which corresponds to the region of movement of the shutter member 116, is formed in the outer surface of the shell member 114, such that the shutter member 116 does not project from the shell member 114 in the thickness direction (either upwardly or downwardly).

As shown in FIGS. 3 and 4, a pushing piece 180 stands erect in a vicinity of the front end of the shutter guide portion 168 of the shutter member 116, so as to be positioned in the same plane as the contact pieces 170. The length by which the pushing piece 180 projects (the vertical direction length measured along the direction of thickness of the shutter guide portion 168) is longer than the length by which the contact pieces 170 project. The pushing piece 180 is supported so as to directly oppose the insertion opening 152. Here, the outer side end surface portion of the pushing piece 180 is a pushed portion 181 which is pushed by the opening/closing lever 228 at the time of opening and closing the shutter member 116. As shown in FIG. 11B, the pushed portion 181 is inclined toward the widthwise direction outer side, from the proximal side toward the distal end side of the pushing piece 180. In this way, when the opening/closing lever 228 applies pushing force along the widthwise direction to the pushed portion 181, the component of force toward the proximal side of the pushing piece 180 is applied as reaction force from the pushed portion 181 to the opening/closing lever 228.

Figure 5:
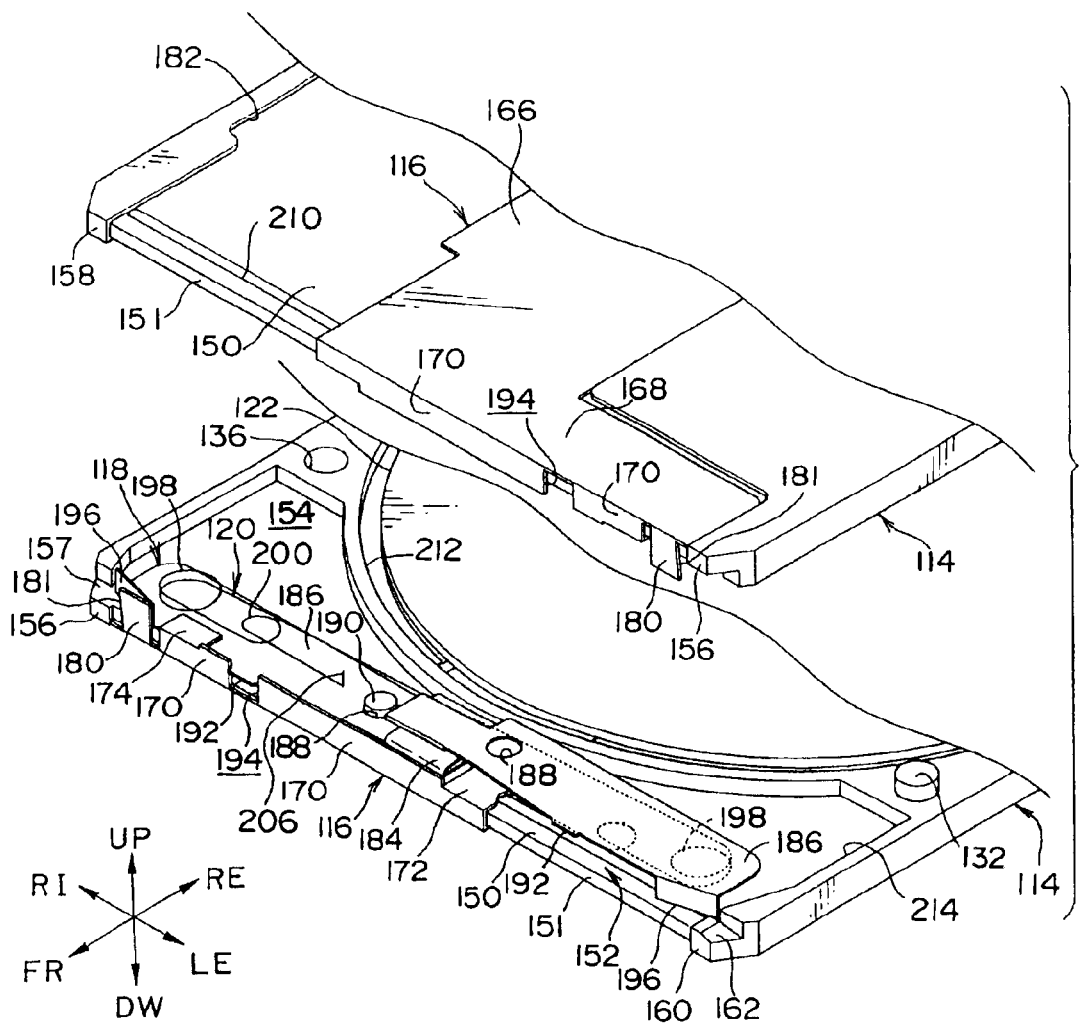
FIG. 5 is an exploded perspective view showing, in an enlarged manner, a vicinity of a leading end portion of the disk cartridge relating to the second embodiment.

As shown in FIGS. 4 and 5, the lock member 118, which is formed by processing (folding or the like) a metal plate such as a stainless plate or the like at a predetermined position, is disposed between the pair of shell members 114. The lock member 118 is formed to include a spring portion 184 and rotating portions 186. The spring portion 184 is formed by bending a metal plate at the widthwise direction central portion thereof into a multi-layer configuration. The rotating portions 186 extend toward the left and the right from the top end and the bottom end of the spring portion 184. The lock member 118 is formed in a configuration having line symmetry, when viewed along the axis of symmetry J1. A pivot hole 188 is formed in the rotating portion 186 in a vicinity of the spring portion 184. A pivot pin 190, which stands erect from the inner surface (the thin portion 150) of the shell member 114, is inserted in the pivot hole 188. The rotating portions 186 rotate independently around the pivot pins 190, and accompanying the rotation, the spring portion 184 deforms. Thus, the spring portion 184 applies elastic force, in directions opposite to the rotating directions, to the rotating portions 186.

Figure 7:
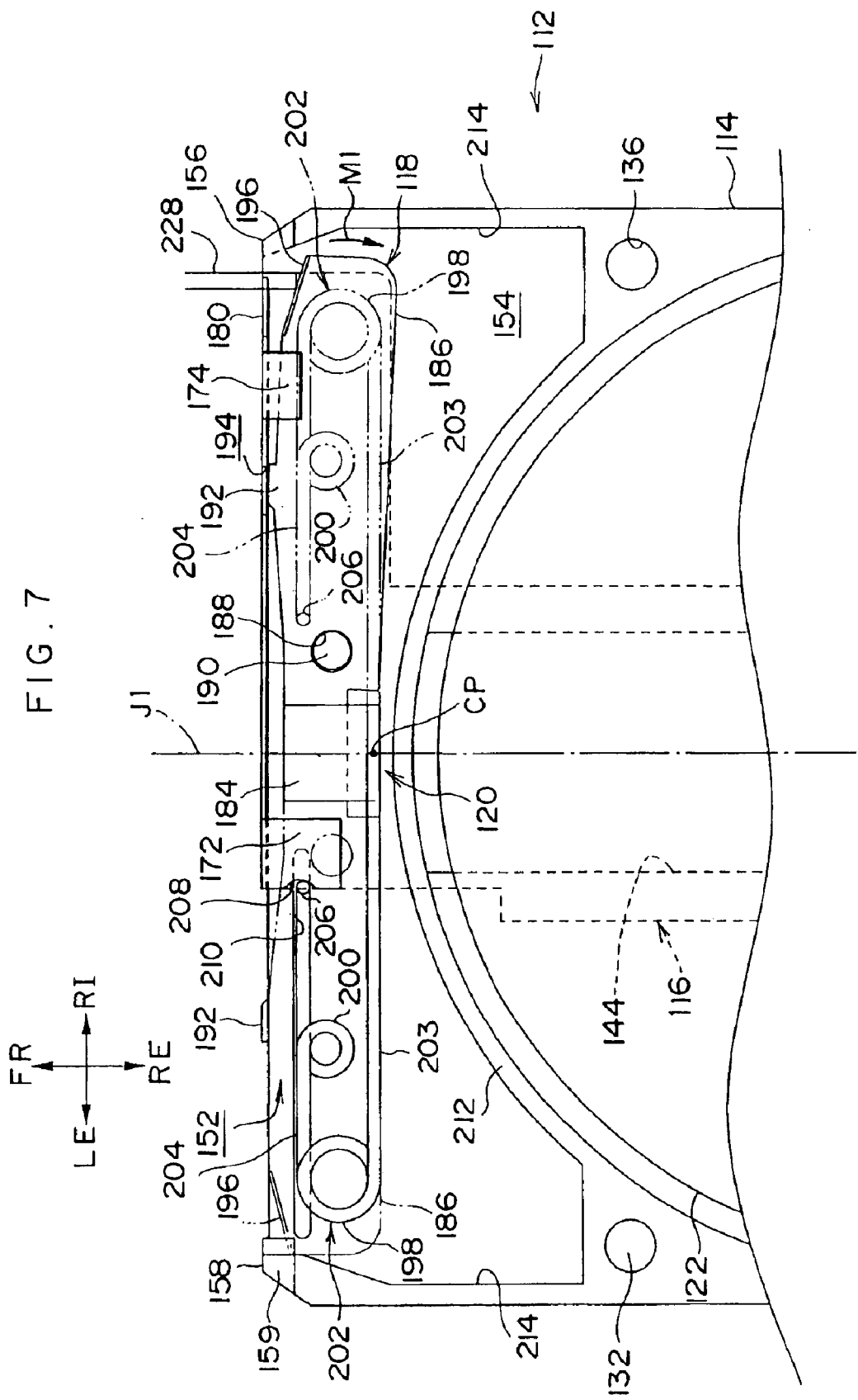
FIG. 7 is a plan view showing the opening/closing lever and the vicinity of the leading end portion of the disk cartridge relating to the second embodiment, and shows a state in which a lock member has been rotated to a released position by the opening/closing lever.

A locking convex portion 192, which projects toward the front, is formed at the longitudinal direction central portion of the rotating portion 186. On the other hand, at the shutter member 116, the contact pieces 170 are partially cut-out such that a locking concave portion 194 is formed. As shown in FIG. 6, when the shutter member 116 is positioned at the closed position, the locking convex portion 192 engages with the locking concave portion 194. Therefore, movement of the shutter member 116 is restricted, and the shutter member 116 is locked at the closed position. In contrast, as shown in FIG. 7, when the rotating portion 186 rotates in the lock releasing direction around the pivot pin 190 and the engagement of the locking convex portion 192 with the locking concave portion 194 is cancelled, the locking of the shutter member 116 is also cancelled, and the shutter member 116 can move to the open position. The rotating portions 186 rotate independently of one another. Thus, when one of the rotating portions 186 rotates in the lock releasing direction, the other rotating portion 186 does not rotate in the lock releasing direction, and the engaged state of the locking convex portion 192, which corresponds to this other rotating portion 186, with the locking concave portion 194 is maintained.

As shown in FIGS. 4 and 5, a pushed piece 196 is formed at the distal end of the rotating portion 186. Within the insertion opening 152, the pushed piece 196 projects further toward the widthwise direction outer side than the pushing piece 180 of the shutter member 116. Toward the front, the pushed piece 196 is inclined from the widthwise direction outer side of the disk cartridge 112 toward the widthwise direction central side.

As shown in FIGS. 4 and 5, the spring member 120 is accommodated within the spring accommodating portion 154 of the cartridge case 130 as described above. The spring member 120 is formed, on the whole, as a long, thin, substantial C-shape along the widthwise direction of the cartridge case 130. The opening portion, which is formed between the pair of distal end portions at the spring member 120, is open toward the front of the cartridge case 130. At the both end portions along the longitudinal direction of the spring member 120, the metal wire is wound in loop shapes so as to form large loop portions 198. Small loop portions 200, which are wound to have smaller diameters than the large loop portions 198, are formed at the intermediate portions between the distal end portions of the spring member 120 and the large loop portions 198. Here, the spring member 120 is formed in a configuration having line symmetry as seen along the axis of symmetry J1. When rotated around the axis of symmetry J1, the spring member 120 after rotation coincides completely with the spring member 120 before rotation.

As shown in FIG. 6, the portion of the spring member 120, which portion is at the proximal end side of the large loop portions 198, is rectilinear. The region where this rectilinear portion and the axis of symmetry J1 intersect is a central point CP of the spring member 120. At the spring member 120, a pair of urging arms 202 extend toward the both sides from the central point CP along the widthwise direction of the disk cartridge 112. The portion of the urging arm 202 from the central point CP to the large loop portion 198 is a linear flexure portion 203. The portion of the urging arm 202 from the large loop portion 198 to the distal end portion of the spring member 120 is a swing portion 204. At the swing portion 204, the portion between the large loop portion 198 and the small loop portion 200, and the portion at the distal end side of the small loop portion 200 are rectilinear. These rectilinear portions of the swing portion 204 and the flexure portion 203 are substantially parallel in a free state in which no elastic deformation arises at the spring member 120.

Here, the large loop portion 198 and the small loop portion 200 are elastically deformable in the direction of twisting with respect to axes LL, LS thereof (see FIG. 11A). The rigidity, in the direction of twisting, of the small loop portion 200 is greater than that of the large loop portion 198. Further, due to the loop portions 198, 200 elastically deforming in the direction of twisting, the swing portion 204 swings around the loop portions 198, 200 which have elastically deformed.

As shown in FIGS. 11A and 11B, at the distal end portions of the pair of swing portions 204 of the spring member 120, the metal wire is bent upward and downward at substantial right angles such that hook portions 206 are formed. On the other hand, as shown in FIG. 12, a spring receiving portion 208 which is concave is formed in the end portion of the guide piece 172 of the shutter member 116, which end portion is at the side opposite the direction in which the shutter guide portion 186 extends. The spring receiving portion 208 is formed by notching the end portion of the guide piece 172 in a substantial V-shape. The depth of the spring receiving portion 208 along the widthwise direction is longer than the radius of the metal wire forming the spring member 120.

One hook portion 206 of the spring member 120 which is assembled into the cartridge case 130, is inserted into the spring receiving portion 208 at the shutter member 116. At this time, one of the urging arms 202 at the spring member 120 urges the shutter member 116, which connected via the hook portion 206, toward the closed position. Further, as shown in FIG. 3, in the state in which the spring member 120 and the shutter member 116 are assembled in the cartridge case 130, the guide piece 172 and the hook portion 206 are shielded by a vicinity of the front end portion of the shutter member 116 and cannot be seen from the exterior of the cartridge case 130.

Here, the interval DF (see FIGS. 11A and 11B) between the pair of hook portions 206 at the time when the spring member 120 is in the free state is shorter than the interval DS between the spring receiving portions 208 at the time when the pair of shutter members 116 at the cartridge case 130 are both at the closed positions. Accordingly, when both of the pair of shutter members 116 are at the closed positions, the spring member 120 is elastically deformed such that the interval DF between the pair of hook portions 206 widens slightly, and applies restoring force in the closing direction to the pair of shutter members 116. When, from this state, one of the shutter members 116 at the closed position moves toward the open position, the hook portion 206 is pushed along the widthwise direction by the spring receiving portion 208. In this way, one of the urging arms 202 at the spring member 120, which urging arm 202 is anchored to this shutter member 116, elastically deforms along the widthwise direction.

As shown in FIG. 4, a guide groove 210, which passes through in the thickness direction, is formed in the thin portion 150 of the shell member 114. The guide groove 210 is formed in a slit-shape which extends along the widthwise direction of the shell member. A portion of the distal end side of the hook portion 206 (the portion further toward the distal end side than the portion which engages with the spring receiving portion 208) is inserted into the guide groove 210. In this way, the hook portion 206 of the spring member 120 is guided so as to move along the opening/closing direction of the shutter member 116. The direction of movement of the hook portion 206 of the spring member 120 is thereby limited to the widthwise direction. As a result, the direction of deformation is limited such that the urging arm 202 deforms only in a predetermined direction, and further, joggling of the shutter member 116 in the front-back direction is prevented. Note that the guide groove 210 does not necessarily have to pass through the thin portion 150. The guide groove 210 can be formed as a recess in the inner surface portion of the thin portion 150, provided that it can be made to be deeper than the length of the inserted portion of the hook portion 206.

As shown in FIGS. 11A and 11B, at the spring member 120, the pair of swing portions 204 are formed so as to be inclined upwardly and downwardly, respectively, from the large loop portions 198 toward the hook portions 206. In this way, when the spring member 120 is in a free state, the interval DT, along the vertical direction, between the distal end portions of the pair of swing portions 204 widens to slightly more than the interval between the guide pieces 172 at the pair of shutter members 116 which are assembled in the cartridge case 130. Accordingly, in the state in which the spring member 120, which is accommodated within the spring accommodating portion 154 of the cartridge case 130, is anchored on the pair of guide pieces 172 by the pair of hook portions 206, the distal end portions of the pair of swing portions 204 elastically deform along the vertical direction in directions of approaching one another, and the pair of swing portions 204 push the pair of guiding pieces 172 upwardly and downwardly, respectively. In this way, the hook portions 206, which are bent from the distal ends of the swing portions 204, are maintained in the state of being inserted in the guide grooves 210, and the hook portions 206 can be prevented from falling out from the guide grooves 210.

At the spring member 120, the interval DT between the distal end portions of the swing portions 204 is set by inclining the pair of swing portions 204 as described above. However, the interval DT between the distal end portions of the swing portions 204 may be set by, instead of inclining the swing portions 204 in this way, forming gaps along the vertical direction between the windings of the large loop portions 198, and adjusting the widths of these gaps appropriately. Further, the hook portion 206 of the spring member 120 is formed by bending the metal wire at substantially a right angle from the distal end portion of the swing portion 204. However, the hook portion 206 may be bent so as to form a U-shape or a V-shape which opens further toward the distal end side, and may be made into a configuration such that the movement of the hook portion 206 in the vertical direction is limited in the state in which the hook portion 206 is anchored on the guide piece 172.

Figure 8:
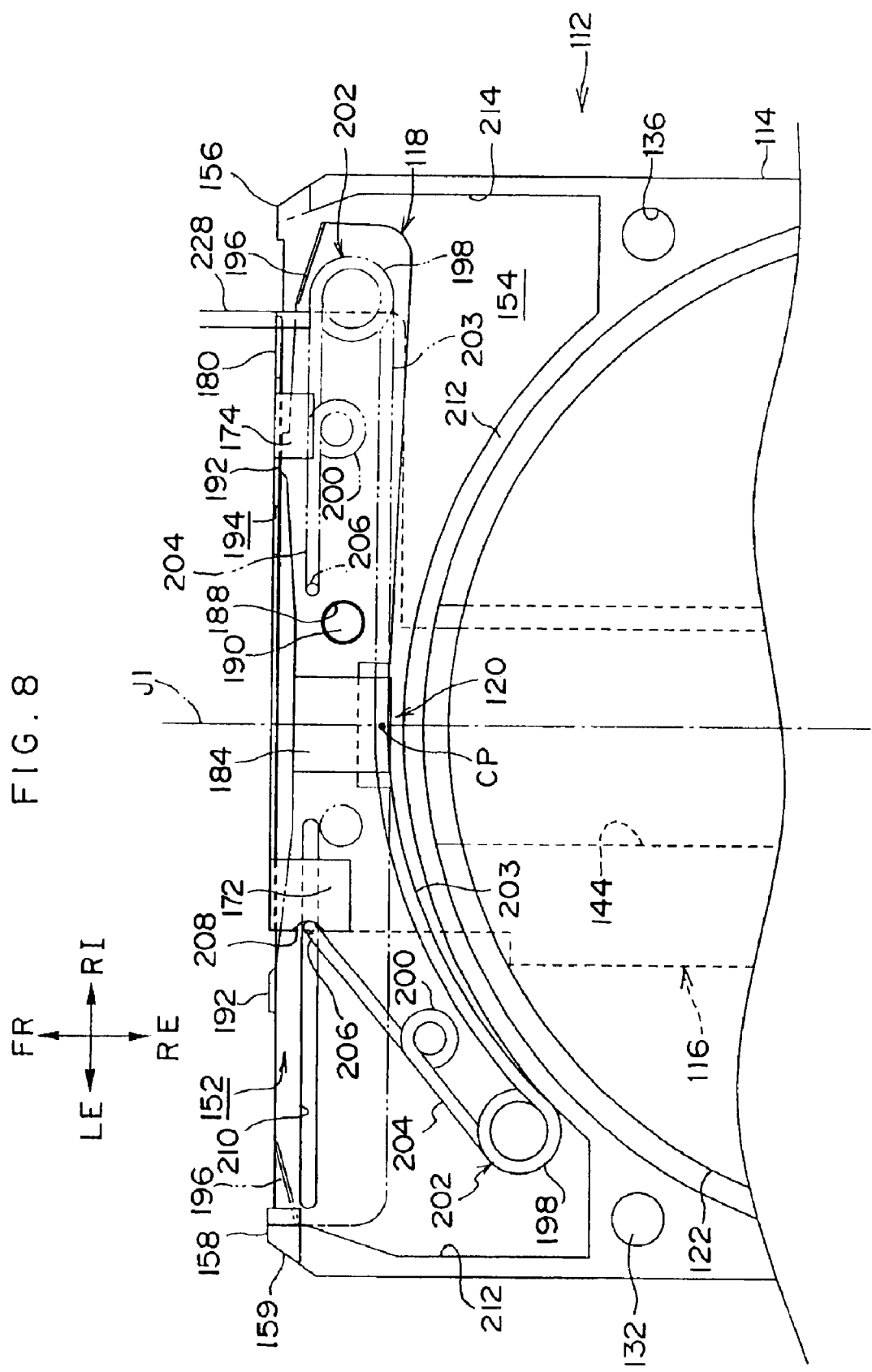
FIG. 8 is a plan view showing the opening/closing lever and the vicinity of the leading end portion of the disk cartridge relating to the second embodiment, and shows a state immediately before a shutter member starts to be moved toward an open position by the opening/closing lever.

As shown in FIG. 3, a separating wall 212, which separates the spring accommodating portion 154 and the disk accommodating portion 124, and side walls 214, which close the widthwise direction outer sides of the spring accommodating portion 154, are formed at the shell member 114. The separating wall 212 is curved so as to run along the outer peripheral end of the recording disk 122. The side walls 214 extend along the front-back direction of the cartridge case 130. Here, when one of the shutter members 116 moves from the closed position to the open position, as shown in FIG. 8, the separating wall 212 functions as a stopper portion for limiting the flexural deformation of the flexure portion 203, due to the large loop portion 198 at the spring member 120 abutting the separating wall 212. As shown in FIG. 10, the side wall 214 functions as a stopper portion for limiting the swinging of the swing portion 204 due to the small loop portion 200 at the spring member 120 abutting the side wall 214.

Next, operation of the disk cartridge 112 relating to the second embodiment, which is structured as described above, will be described.

At the time when the disk cartridge 112 is loaded into a drive device, the disk cartridge 112 is inserted into a cartridge holder (not shown) of the drive device along the front-back direction. When the disk cartridge 112 is inserted into the cartridge holder and reaches a predetermined loaded position, a pair of reference pins provided at the drive device is inserted into the circular holes 126 and the elongated holes 128 of the disk cartridge 112, such that the disk cartridge 112 is set in a state of being fixed at the loaded position.

When the disk cartridge 112 is inserted to the loaded position, the shutter opening/closing mechanism of the drive device moves the opening/closing lever 228, which is formed in the shape of a pin, from a standby position (see FIG. 6) at the widthwise direction outer side of the disk cartridge 112, toward the shutter open position side (see FIG. 10). In this way, the distal end portion of the opening/closing lever 228 passes through the guide groove 160 provided at the front edge portion of the cartridge case 130, and moves into the insertion opening 152. The distal end portion of the opening/closing lever 228, which has moved into the insertion opening 152, abuts the pushed piece 196 of the lock member 118. Further, when the opening/closing lever 228 moves toward the shutter open position side, as shown in FIG. 7, the pushed piece 196 of the lock member 118 is pushed rearward, and the rotating portion 186 rotates in the lock releasing direction against the elastic force of the spring portion 184. Thus, the locking convex portion 192 moves apart from the locking concave portion 194, and the locking of the shutter member 116 is released.

When the opening/closing lever 228 moves further in the insertion opening 152 toward the shutter open position side, the opening/closing lever 228 abuts the pushed portion 181 of the pushing piece 180 of the shutter member 116, and pushes the shutter member 116 via the pushing piece 180, and slides the shutter member 116 from the closed position toward the open position. At this time, the shutter member 116 is slid toward the shutter open position while one of the urging arms 202 at the spring member 120 is gradually elastically deformed. When the opening/closing lever 228 moves to the shutter open position shown in FIG. 10, the shutter opening/closing mechanism of the drive device stops the movement of the opening/closing lever 228.

When the shutter member 116 moves from the closed position toward the open position, the shutter member 116 pushes one of the urging arms 202 at the spring member 120 outwardly along the widthwise direction via the guide piece 172. The operations of the spring member 120 at this time are as follows. First, immediately after the start of movement of the shutter member 116 from the closed position, at the spring member 120, the flexure portion 203 of the urging arm 202 which is anchored on the shutter member 116 flexurally deforms toward the rear with a vicinity of the central point CP being the origin of the flexural deformation, as shown in FIG. 8. At this time, the flexure portion 203 flexurally deforms until the large loop portion 198 provided at the distal end portion thereof abuts the separating wall 212. An increase in the flexural deformation is limited by the large loop portion 198 abutting the separating wall 212.

Figure 9:
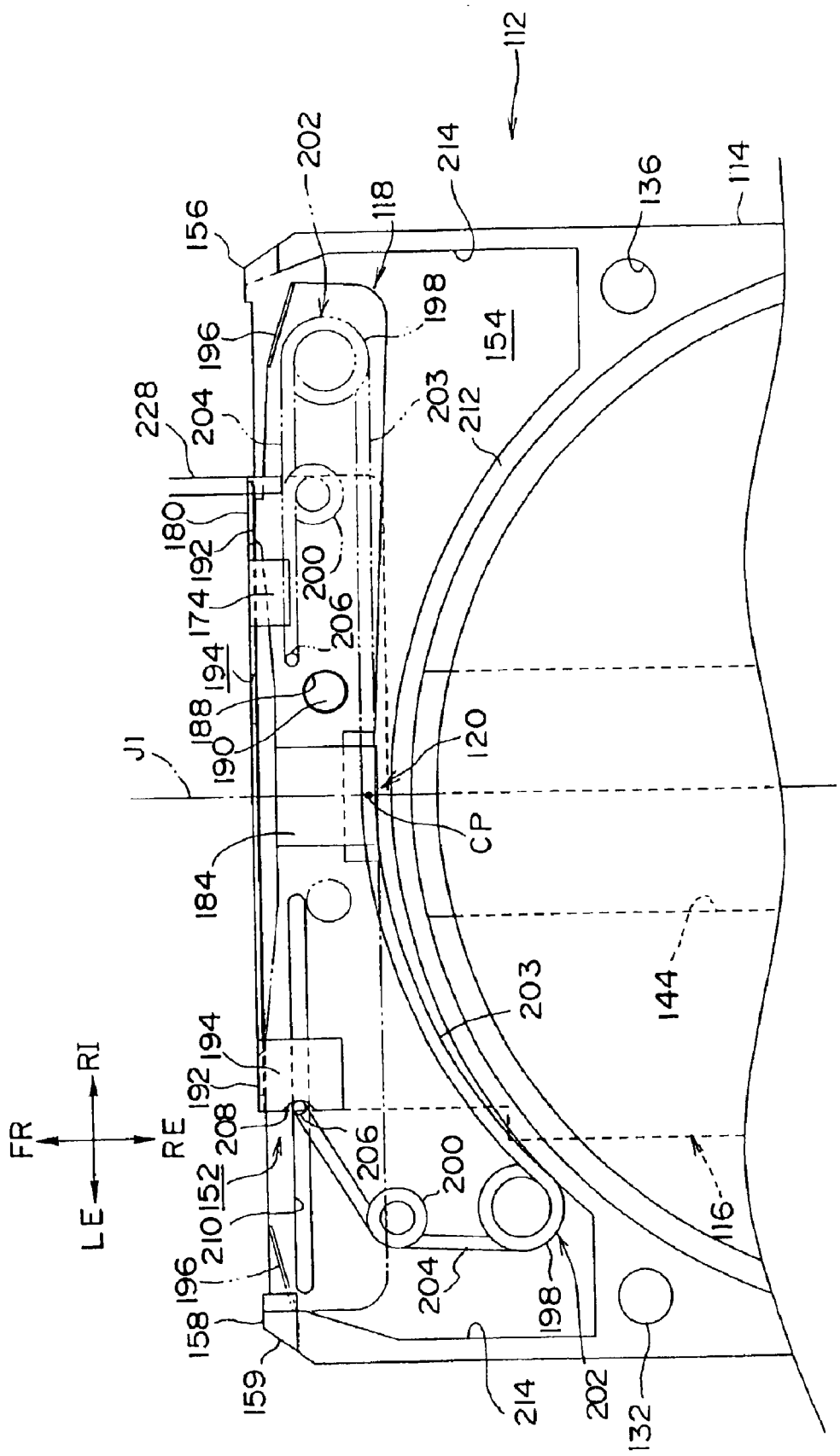
FIG. 9 is a plan view showing the opening/closing lever and the vicinity of the leading end portion of the disk cartridge relating to the second embodiment, and shows a state in which the shutter member has reached a position substantially midway between a closed position and an open position by the opening/closing lever.

After the large loop portion 198 has abutted the separating wall 212, when the shutter member 116 moves further toward the open position, the large loop portion 198, whose rigidity in the direction of twisting is low as compared with that of the small loop portion 200, torsionally deforms first. In this-way, as shown in FIG. 9, the rectilinear portion between the large loop portion 198 and the small loop portion 200 at the swing portion 204 swings counterclockwise around the large loop portion 198. When the shutter member 116 moves to slightly before the open position, as shown in FIG. 10, the small loop portion 200 abuts the side wall 214, and an increase in the torsional deformation of the large loop portion 198 is limited. After the small loop portion 200 has abutted the side wall 214, when the shutter member 116 reaches the open position, the small loop portion 200 is in a state of being slightly torsionally deformed, and the rectilinear portion at the distal end side of the small loop portion 200 swings slightly in the counterclockwise direction around the small loop portion 200.

As described above, as the shutter member 116 moves from the closed position toward the open position, at the spring member 120, first, the flexure portion 203 flexurally deforms. Thereafter, the large loop portion 198 and the small loop portion 200 successively torsionally deform. Therefore, even if the spring accommodating portion 154 is narrow, the spring member 120, before and after deformation or in the midst of deforming, can be reliably accommodated within the spring accommodating portion 154, and can deform in a manner following the movement of the shutter member 116 from the closed position to the open position. In contrast, considering, for example, a case in which there is no small loop portion 200 at the urging arm 202, as shown by the two-dot chain line in FIG. 10, the rectilinear portion at the distal end side of the large loop portion 198 does not bend. Thus, a portion of the distal end side of the swing portion 204 projects further forward than the shell member 14, which is not preferable.

Further, when one of the shutter members 116 moves from the closed position to the open position, at the spring member 120, only the one urging arm 202 which is anchored on this one shutter member 116 deforms elastically, and no elastic deformation arises at the other urging arm 202. In this way, the other shutter member 116 can be reliably held at the closed position. In other words, the other urging arm 202, which is anchored on the shutter member 116 which is at the closed position, is fixed with respect to the cartridge case 130, and the vicinity of the central point CP of the spring member 120, which is the border between the pair of urging arms 202, works as a fixed end of the one urging arm 202. Thus, only the one urging arm 202 reliably deforms within the spring accommodating portion 154, and elastic force toward the closed position works on the shutter member 116.

At the disk cartridge 112, the shutter member 116, which is disposed at the lower surface side of the cartridge case 130, is held at the open position by the opening/closing lever 228 as described above, and the window portion 144 is opened. In this way, the drive device inserts the spindle through the window portion 144 into the cartridge case 130 and connects the spindle to the center hub 146. The drive device can thereby rotate the recording disk 122. Moreover, a light beam or the like from the recording/playback head can be illuminated through the window portion 144 onto the recording surface at the lower surface side of the recording disk 122. Writing of information onto and reading of information from this recording surface are therefore possible.

At the time of discharging the disk cartridge 112, the shutter opening/closing mechanism of the drive device moves the opening/closing lever 228, which is holding the shutter member 116 at the open position, from the shutter open position to the standby position. In this way, due to the urging force of the spring 120, the shutter member 116 follows the lever 228 so as to move from the open position to the closed position. At this time, in a manner opposite to that at the time of opening the shutter member 116, after the small loop portion 200 and the large loop portion 198, at which torsional deformation had arisen, are successively restored, the flexure portion 203 at which flexural deformation had arisen is restored, and the spring member 120 returns to the initial configuration shown in FIG. 6. Substantially simultaneously with the shutter member 116 moving to the closed position, the opening/closing lever 228 moves apart from the pushing piece 180, and immediately thereafter, moves apart from the pushed piece 196 of the lock member 118 as well. In this way, the locking convex portion 192 of the lock member 118 is fit into the locking concave portion 194 of the shutter member 116, and the shutter member 116 is locked at the closed position. Moreover, if the disk cartridge 112, which has been discharged from the drive device, is inverted and inserted into the drive device, recording and playback of information onto and from the recording surface at the opposite side of the recording disk 122 are possible.

The disk cartridge 112 relating to the above-described embodiment has the spring member 120 which extends along the opening/closing direction of the shutter member 116 within the cartridge case 130, and whose pair of urging arms 202, which extend toward the both sides from the central point CP along the opening/closing direction, are elastically deformable along the opening/closing direction. By the pair of urging arms 202, the spring member 120 urges the pair of shutter members 116 to their respective closed positions. As one of the shutter members 116 moves from the closed position to the open position, only the one urging arm 202 anchored to this one shutter member 116 is elastically deformed along the opening/closing direction. In this way, the pair of shutter members 116, which are disposed at the obverse side and the reverse surface side of the cartridge case 130, can respectively be urged toward their closed positions by a single spring member 120. Thus, as compared with a case in which a pair of spring members are provided separately so as to correspond to the pair of shutter members 116 respectively, the spring member 120 itself can be made larger-sized, and the work for assembling the spring member 120 into the cartridge case 130 is facilitated.

In the disk cartridge 112 relating to the present embodiment, the recording disk 122 is a disk in which information is recorded onto or played-back from the recording surfaces by light such as a laser beam or the like. However, other than such a structure, the disk cartridge 112 may be a disk which utilizes magnetism or may be a disk which utilizes both magnetism and light, for the recording of information onto and the playback of information from the recording disk.

As described above, in accordance with the disk cartridge relating to the present invention, a pair of shutter members, which correspond to the obverse and reverse surfaces of a recording disk respectively, can be urged toward their respective closed positions by a single spring member having a simple structure.

(Third Embodiment)

A third embodiment of the present invention will be described hereinafter with reference to the drawings.

A disk cartridge 312 of the third embodiment will be described hereinafter on the basis of FIGS. 13 through 18C. Note that, in the drawings, when arrows FR, RE, UP, DW, RI and LE are used, they indicate, respectively, the front direction (the loading direction), the rear direction, the upward direction, the downward direction, the rightward direction, and the leftward direction of the disk cartridge 312 while looking in the direction of loading (inserting) the disk cartridge 312 into a drive device. Hereinafter, when the top, bottom, front, rear, left and right are indicated, they correspond to the directions of the respective arrows. Further, the "longitudinal direction", "thickness direction" and "widthwise direction" of the disk cartridge 312 are, respectively, the front-back (back-front) direction, the up-down (down-up) (vertical) direction, and the left-right (right-left) direction. These respective directions are for convenience of explanation, and are of course not intended to limit the directions at the time of using the disk cartridge 312. Accordingly, for example, the disk cartridge 312 may be disposed horizontally or may be disposed vertically at the time of use thereof.

Figure 14:
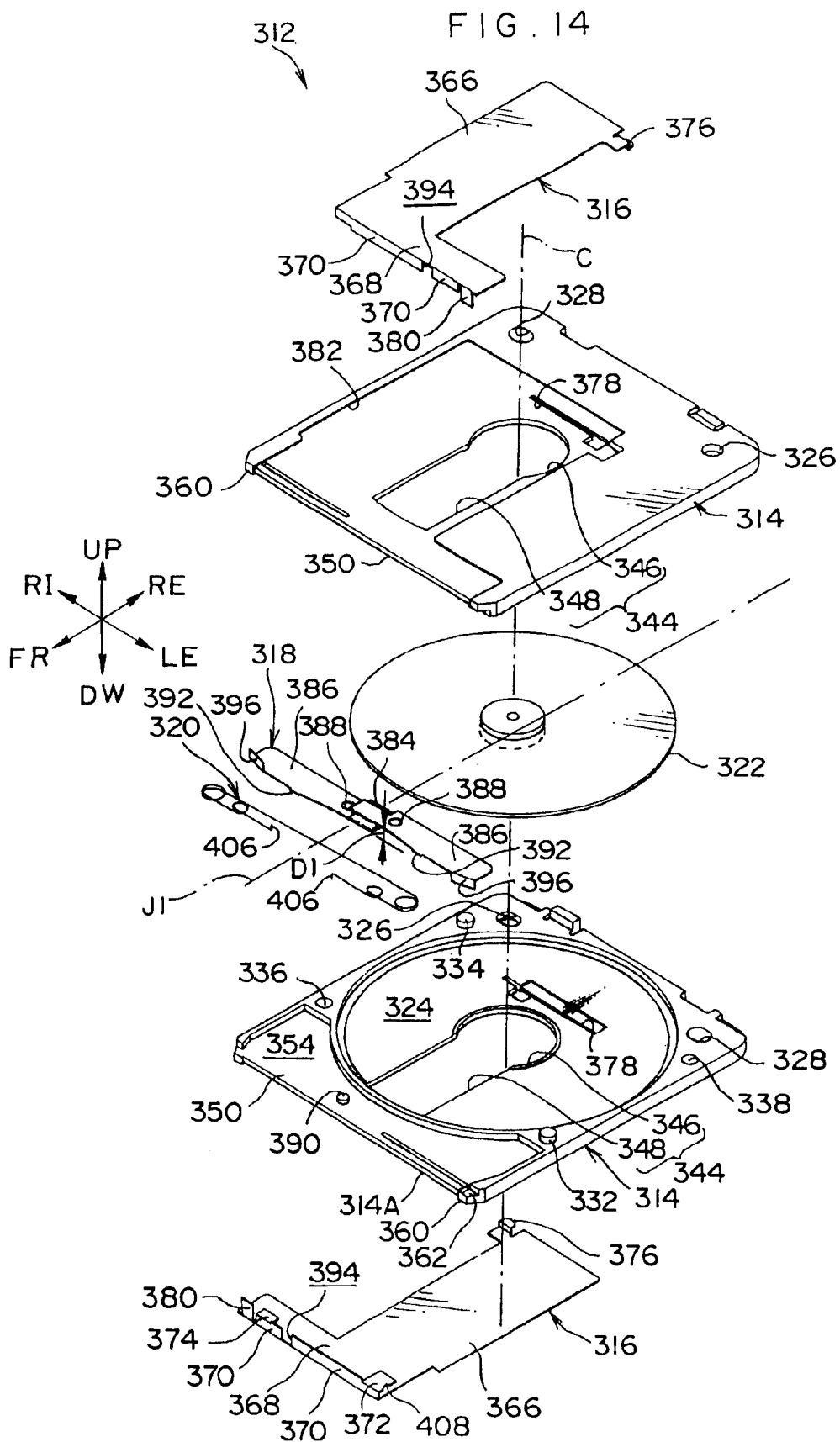
FIG. 14 is an exploded perspective view showing a disk medium and the disk cartridge of the third embodiment.
Figure 15:
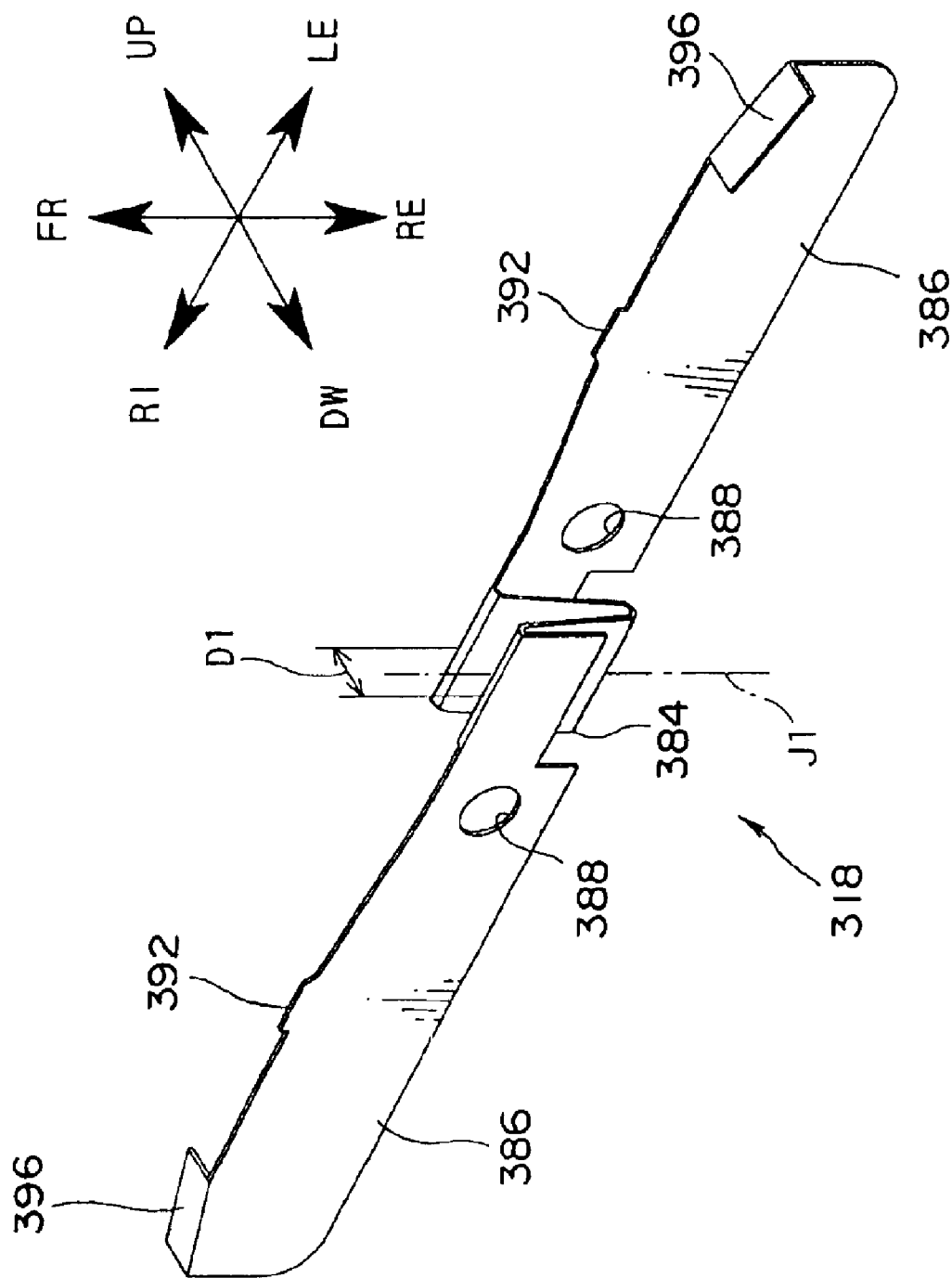
FIG. 15 is a perspective view showing, in an enlarged manner, a lock member of the disk cartridge of the third embodiment.

As shown in FIG. 14, the disk cartridge 312 has two case members 314, two shutter members 316 provided so as to correspond to the case members 314 respectively, and one lock member 318 and one spring member 320 which are provided in common for the two shutter members 316.

The two case members 314 have the same configuration, and as seen in plan view, are each formed as a substantially rectangular plate shape. The front-back dimension of the case member 314 is greater than the left-right dimension thereof, such that the disk cartridge 312 cannot erroneously be inserted into a drive device (not shown) along the widthwise direction (the left-right direction) thereof.

A circular hole 326 and an elongated hole 328 for positioning are formed in predetermined positions of the case member 314. Within the drive device, the case member 314 is positioned by reference pins (not shown) of the drive device being inserted into the circular hole 326 and the elongated hole 328.

A medium accommodating portion 324, which corresponds to a disc-shaped disk medium 322, is formed in the case member 314. A case 330 (see FIG. 13) is formed by superposing the case members 314 in a state in which the two medium accommodating portions 324 oppose one another. The disk medium 322 can be held within the medium accommodating portions 324. Hereinafter, the surface at which the medium accommodating portion 324 is formed will be called the inner surface of the case member 314, and the surface at the opposite side will be called the outer surface of the case member 314.

Two bosses 332, 334 stand erect at the inner surface of the case member 314. Fit-together holes 336, 338, which correspond to the bosses 332, 324, are formed at positions which are symmetrical with respect to the axis of symmetry J1. When the corresponding bosses 332, 334 are fit together with the fit-together holes 336, 338 in the state in which the two case members 314 are superposed, the superposed state of the case members 314 is maintained, and the case members 314 cannot be inadvertently separated from one another.

An opening 344 is formed in the case member 314. The opening 344 is formed by an opening portion 346 for rotating/driving and an opening portion 348 for reading/writing. The opening portion 346 for rotating/driving is concentric with the accommodated disk medium 322 (the center is shown by central axis C) and has a smaller diameter than the disk medium 322. The opening portion 348 for reading/writing is continuous with the opening portion 346 for rotating/driving and is a substantial rectangle which is formed toward the front. The front end of the opening portion 348 for reading/writing is curved in a circular-arc-shape. In the state in which the disk cartridge 312 is loaded in a drive device, a rotating/driving member of the drive device (e.g., a rotating spindle shaft) accesses the disk medium 322 from the opening portion 346 for rotating/driving, and can rotate the disk medium 322. Further, a reading/writing member of the drive device (e.g., a recording/playback head) accesses the disk medium 322 from the opening portion 348 for reading/writing, and can carry out reading of information from or writing of information onto the disk medium 322.

A thin portion 350, which is locally thin from the inner surface side toward the outer surface side, is formed in the front edge portion of the case member 314. An entry groove 352 and a spring accommodating/deforming region 354 are formed by the thin portions 350. A shutter opening/closing pin of the drive device is slid into the entry groove 352, and the distal end of the shutter opening/closing pin enters in from the widthwise direction outer side of the disk cartridge 312. The spring member 320 is accommodated in the spring accommodating/deforming region 354.

A convex portion 360, which projects from the thin portion 350, is formed at the left end portion of the entry groove 352. As can be understood from FIG. 13, the entrance portion of the entry groove 352 is substantially narrowed by the convex portion 360. A taper surface 362 is formed at the distal end surface of the convex portion 360. In the initial stages of entry of a shutter opening/closing pin 412 (see FIGS. 16 and 17) into the entry groove 352, the shutter opening/closing pin 412 is guided along the taper surface 362. The shutter opening/closing pin 412 reliably pushes a pushed piece 396 of the lock member 318 and a pushed rib 380 of the shutter member 316 which will be described later.

The shutter members 316 are disposed at the outer surfaces of the respective case members 314. The shutter member 316 is formed in a substantial L-shape having a shutter main body portion 366 of a size which can close at least the opening 344, and a shutter guide portion 368 which extends from the front side of the shutter main body portion 366. Contact pieces 370, which rise at a substantially right angle, stand erect at the shutter guide portion 368. Two guide pieces 372, 374 are formed parallel to the shutter guide portion 368, at end portions of the contact pieces 370. When the shutter member 316 is disposed at a predetermined position of the case member 314, the contact pieces 370 contact a front edge 314A of the case member 314, and the guide pieces 372, 374 oppose the case member 314 at the opposite side of the shutter guide portion 368. In this way, the shutter member 316 can be prevented from inadvertently falling off or joggling.

A guide piece 376 is formed at a vicinity of the rear end of the shutter main body portion 366. The guide piece 376 extends in the same direction as the shutter guide portion 368, and rises up at a right angle with respect to the shutter main body portion 366. The distal end of the guide piece 376 is bent parallel to the shutter main body portion 366. A guide hole 378, which passes through the case member 314 in the thickness direction thereof, is formed in the case member 314 along the left-right direction. The guide piece 376 is inserted into the guide hole 378. In this way as well, the shutter member 316 can be prevented from inadvertently falling off from or joggling at the case member 314. The shutter member 316 slides, without joggling, while being guided by the guide pieces 372, 374, 376 from the position at which the shutter main body portion 366 of the shutter member 316 closes the opening 344 of the case member 314 (a closed position shown by the solid line in FIG. 13), to the position at which the opening 344 is open (an open position shown by the two-dot chain line in FIG. 13). Note that a concave portion 382, which corresponds to the region of movement of the shutter member 316, is formed in the outer surface of the case member 314, such that the shutter member 316 does not project from the case member 314 in the thickness direction (either upwardly or downwardly).

The pushed rib 380 stands erect at a vicinity of the distal end of the shutter guide portion 368 of the shutter member 316, so as to be positioned in the same plane as the contact pieces 370. When the shutter opening/closing pin of the drive device moves into the entry groove 352, the shutter opening/closing pin contacts the pushed rib 380. Due to the shutter opening/closing pin moving further, the shutter member 316 is pushed toward the open position.

As shown in FIG. 14, the lock member 318, which is formed by processing (folding or the like) a plate member at a predetermined position, is disposed between the two case members 314. As shown in detail in FIG. 15, the lock member 318 is formed to include a spring portion 384 and rotating portions 386. The spring portion 384 is formed by bending a metal plate at the left-right direction center thereof into a multi-layer configuration. The rotating portions 386 extend toward the left and the right from the top end and the bottom end of the spring portion 384. The lock member 318 is formed in a configuration having line symmetry, when viewed along the axis of symmetry J1. Accordingly, when the lock member 318 is rotated 180° around the axis of symmetry J1, the lock member 318 after rotation and the lock member 318 before rotation coincide completely.

A pivot hole 388 is formed in the rotating portion 386 in a vicinity of the spring portion 384. A pivot pin 390, which stands erect from the inner surface (the thin portion 350) of the case member 314, is inserted in the pivot hole 388 (see FIGS. 16 and 17). The rotating portions 386 rotate independently around the pivot pins 390, and accompanying the rotation, the spring portion 384 deforms. Thus, the spring portion 384 applies elastic force, in directions opposite to the rotating directions, to the rotating portions 386.

Figure 16:
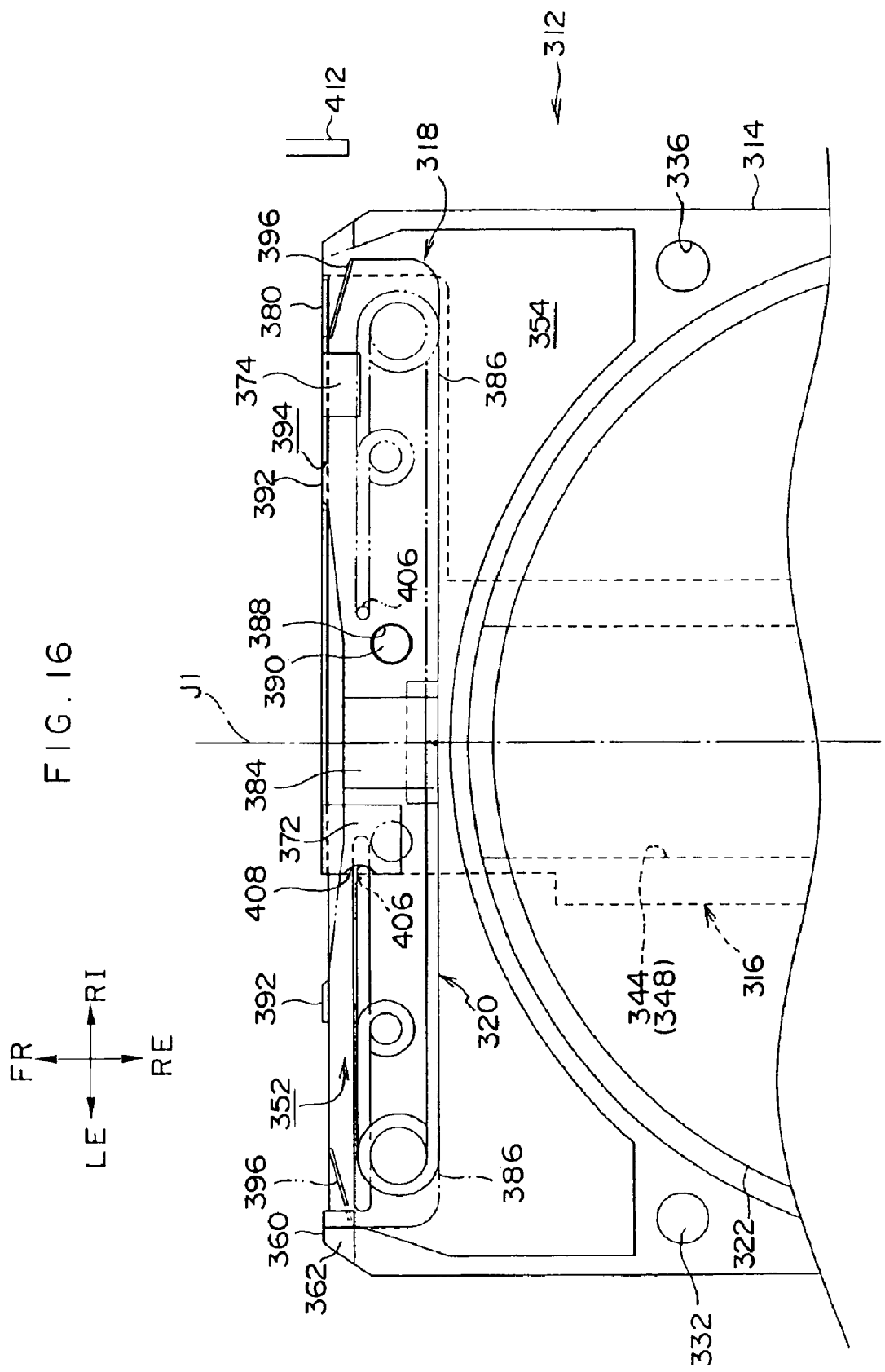
FIG. 16 is a diagram for explanation, which shows a state when a shutter member is at a closed position in the disk cartridge of the third embodiment.
Figure 17:
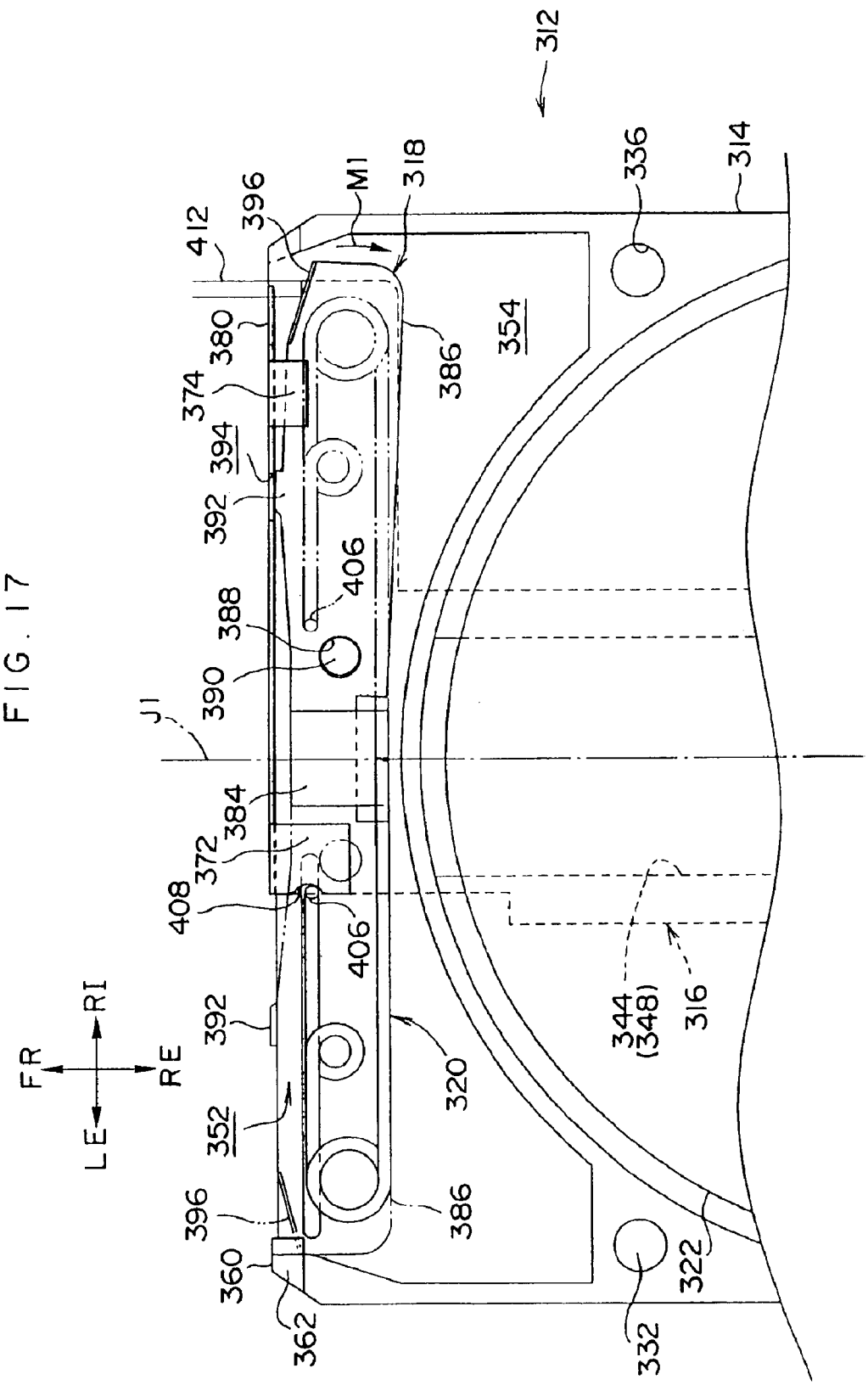
FIG. 17 is a diagram for explanation, which shows a state when locking of the shutter member is released in the disk cartridge of the third embodiment.

A locking convex portion 392, which projects toward the front, is formed at the longitudinal direction center of the rotating portion 386. On the other hand, at the shutter member 316, the contact pieces 370 are partially cut-out such that a locking concave portion 394 is formed. As shown in FIG. 16, when the shutter member 316 is positioned at the closed position and the locking convex portion 392 engages with the locking concave portion 394, movement of the shutter member 316 is restricted, and the shutter member 316 is locked at the closed position. In contrast, as shown in FIG. 17, when the rotating portion 386 rotates in the lock releasing direction (the direction of arrow M1) around the pivot pin 390 and the engagement of the locking convex portion 392 with the locking concave portion 394 is cancelled, the locking of the shutter member 316 is also cancelled, and the shutter member 316 can move toward the open position. The rotating portions 386 rotate independently of one another. Thus, when one of the rotating portions 386 rotates in the lock releasing direction, the other rotating portion 386 does not rotate in the lock releasing direction, and the engaged state of the locking convex portion 392, which corresponds to this other rotating portion 386, with the locking concave portion 394 is maintained.

The pushed piece 396 is formed at the distal end of the rotating portion 386. Within the entry groove 352, the pushed piece 396 projects further toward the widthwise direction outer side than the pushed rib 380 of the shutter member 316. The pushed piece 396 is formed in a taper shape which, from the widthwise direction outer side of the disk cartridge 312 toward the widthwise direction central side, gradually inclines toward the front. As shown in FIG. 17, when the shutter opening/closing pin 412, which has moved into the entry groove 352, contacts the pushed piece 396 and moves further toward the transverse direction center of the disk cartridge 312, the pushed piece 396 is pushed by the shutter opening/closing pin 412. The rotating portion 386 rotates in the lock releasing direction (the direction of arrow M1) against the urging force of the spring portion 384.

Figure 18A:
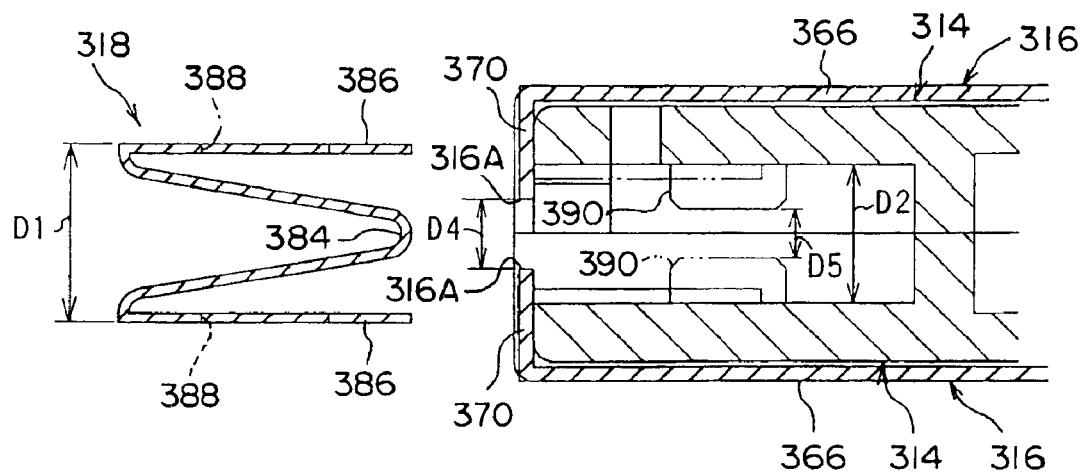
FIGS. 18A, 18B and 18C are diagrams for explanation, which show processes of assembling a lock member into a case in the disk cartridge of the third embodiment.

The spring portion 384 of the lock member 318 urges the two rotating portions 386 to move apart from one another in the vertical direction. Further, as shown in FIG. 18A, in the natural state of the spring portion 384, a vertical direction interval D1 between the rotating portions 386 is set to be slightly wider than an interval D2 between the thin portions 350 of the case 330. Accordingly, in the state in which the lock member 318 is disposed at a predetermined position of the case 330 (see FIG. 18C), the rotating portions 386 are pressed by the thin portions 350 and are displaced upwardly and downwardly in directions of approaching each other. The elastic reaction force of the deformation of the spring portion 384 due to this displacement works to move the rotating portions 386 apart from each other in the vertical direction. In this way, the state in which the pivot pins 390 are inserted in the pivot holes 388 of the lock member 318 can be reliably maintained.

Figure 18B:
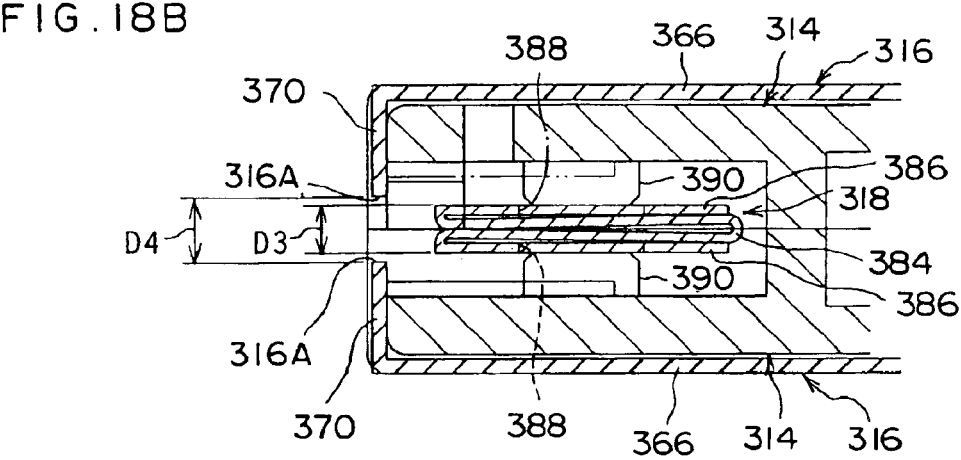

Further, as shown in FIG. 18B, an interval D3 in the vertical direction, at the time when the rotating portions 386 are made to approach each other in the vertical direction against the urging force of the spring portion 384, is smaller than an interval D4 between opening portions 316A of the shutter members 316 in the state of forming the case 330, and than an interval D5 between distal ends of the pivot pins 390. Accordingly, in the state in which the rotating portions 386 are pushed up and down so as to contract, the lock member 318 is inserted from the opening portions 316A of the shutter members 316, and can be disposed at a predetermined position between the case members 314 (i.e., at a predetermined position of the entry groove 352).

At the lock member 318, essentially, the two members which lock the two shutter members 316 respectively can be made integral. Accordingly, as compared with a case in which a lock member is provided separately for each of the two shutter members, the lock member of the present embodiment is more efficient and more economical.

As shown in FIG. 14, the spring member 320 is disposed between the two case members 314. In the same way as the lock member 318, the spring member 320 has rotational symmetry as seen along the axis of symmetry J1.

At the both ends of the spring member 320, the metal wire is bent upward and downward at substantially right angles such that hook portions 406 are formed. A spring receiving portion 408 is formed in the guide piece 372 of the shutter member 316. In the state in which the spring member 320 is assembled within the case 330 and the shutter members 316 are at their closed positions, the hook portions 406 engage with the spring receiving portions 408. At this time, the spring member 320 is deformed such that the interval between the hook portions 406 widens slightly, and the spring member 320 applies elastic force in the closing directions to the shutter members 316. When, from this state, the shutter member 316 attempts to move to its open position, the spring member 320 deforms and applies an even greater elastic force in the closing direction to the shutter member 316.

Next, the method of forming the disk cartridge 312 of the present embodiment by assembling the above-described respective members, and the operation of the disk cartridge 312 will be described.

In order to form the disk cartridge 312, first, the shutter members 316 are mounted to the case members 314. In the present embodiment, the two case members 314 have the same configuration, and the two shutter members 316 also have the same configuration. Accordingly, when mounting the shutter members 316 to the case members 314, there is no need to consider the relationship of correspondence between the case members 314 and the shutter members 316. Thus, as compared with a case in which the respective case members 314 have different shapes, it is easy to maintain dimensional accuracy, and easy to manage the number of parts. Further, the two case members 314 can be manufactured in the same manufacturing process in the same manufacturing device (e.g., a molding die). Similarly, the shutter members 316 as well can be manufactured in the same manufacturing process in the same manufacturing device (e.g., a press machine or a folding machine) In this way, the parts costs can be reduced.

Figure 13:
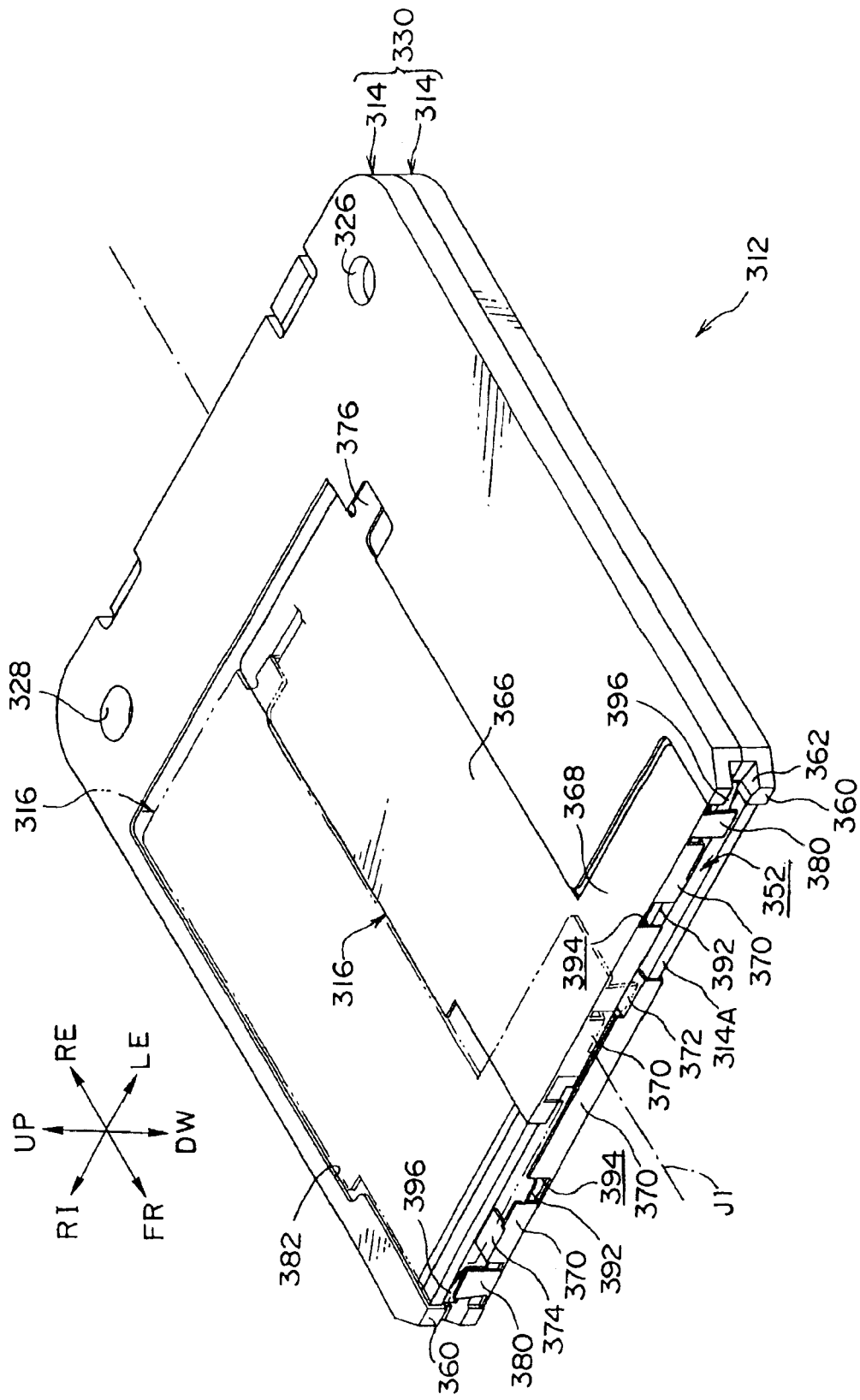
FIG. 13 is a perspective view showing a disk cartridge of a third embodiment of the present invention.

In this way, the two case members 314, to which the shutter members 316 are mounted, are prepared. In the state in which one case member 314 is inverted and the medium accommodating portions 324 are made to oppose one another, the disk medium 322 is accommodated into one medium accommodating portion 324. Then, the two case members 314 are assembled together and made integral, and as shown in FIG. 13, the case 330 is formed. At this time, when the corresponding bosses 332, 334 are fit-together with the fit-together holes 336, 338, the case members 314 are maintained in their superposed state, and do not inadvertently separate from one another.

Next, the spring member 320 is installed. When the spring member 320 is inserted into the spring accommodating/deforming region 354 from the outer side of the case 330 and the spring member 320 is disposed at a predetermined position of the case 330, the distal ends of the hook portions 406 are inserted into the spring receiving portions 408 of the shutter members 316.

Finally, the shutter members 316 are set at their closed positions, and the lock member 318 is installed. As shown in FIG. 18A, the vertical direction interval D1 of the lock member 318 at the time when the rotating portions 386 are in natural states is set to be slightly wider than the interval between the thin portions 350 of the case 330. However, as can be understood from FIG. 18B, the vertical direction interval D3, at the time when the rotating portions 386 are made to approach one another in the vertical direction, is set to be smaller than the interval D4 between the opening portions 316A of the shutter members 316 in the state in which the case 330 is formed, and the interval D5 between the distal ends of the pivot pins 390. Thus, the lock member 318 is pushed to contract in the vertical direction, and can be inserted at a predetermined position within the entry groove 352 from the opening portions 316A of the shutter members 316, i.e., from the front side of the case 330.

Figure 18C:
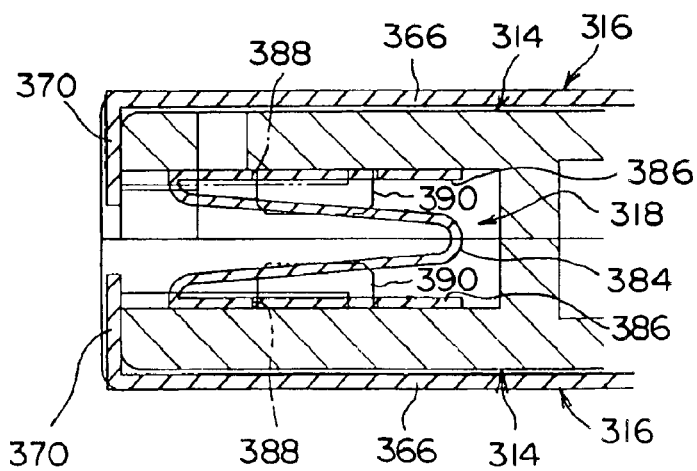

As shown in FIG. 18B, in the state in which the positions of the pivot holes 388 and the pivot pins 390 coincide as seen in the vertical direction, the force for making the rotating portions 386 approach one another upwardly and downwardly is cancelled. In this way, as shown in FIG. 18C, the elastic reaction force of the spring portion 384 acts to move the rotating portions 386 upwardly and downwardly away from one another. Thus, the pivot pins 390 are inserted into the pivot holes 388, and this state can be reliably maintained. Further, because the locking convex portions 392 engage with the locking concave portions 394, the shutter members 316 are locked at their closed positions.

Note that the order in which the lock member 318 and the spring member 320 are assembled is not limited, and may be the opposite of that described above.

As described above, the disk cartridge 312 of the present embodiment is formed in a state in which the disk medium 322 is accommodated at the interior thereof.

When information is to be written onto or read from the disk medium 322 in a drive device, first, as shown in FIG. 16, the shutter opening/closing pin 412 of the drive device slides and enters into the entry groove 352 from a transverse direction end portion of the disk cartridge 312, and contacts the pushed piece 396 of the lock member 318. When the shutter opening/closing pin 412 enters in further, as shown in FIG. 17, the pushed piece 396 is pushed, and the rotating portion 386 rotates in the lock releasing direction (the direction of arrow M1) against the elastic force of the spring portion 384. Thus, the locking convex portion 392 separates from the locking concave portion 394, and the locking of the shutter member 316 is cancelled. At this time, no force whatsoever in the lock releasing direction is applied to the rotating portion 386 at the side where the shutter opening/closing pin 412 has not entered. Therefore, the corresponding shutter member 316 is reliably locked at the closed position.

When the shutter opening/closing pin 412 enters further into the entry groove 352, the shutter opening/closing pin 412 contacts the pushed rib 380 of the shutter member 316 and pushes the shutter member 316 toward the open position. Thus, the shutter member 316 moves toward the open position. When the shutter member 316 reaches the open position, the opening 344 is opened.

Note that the disk cartridge 312 of the present embodiment is formed to be completely symmetrical around axis of symmetry J1. Thus, when accessing the opposite side of the disk medium 322 to read or write information, it suffices to turn the disk cartridge 312 upside down and load it into the drive device.

As described above, in the disk cartridge 312 of the present invention, only one lock member 318 is provided for the two shutter members 316. In other words, the members for locking which correspond to the respective shutter members 316 are provided integrally. Locking and releasing of locking can be carried out independently for each of the shutter members 316 by a single member (the lock member 318). The locked state can be reliably maintained by the elastic force of the spring portion 384. Accordingly, as compared with a case in which two locking members are provided for the two shutter members, or a case in which an urging member for maintaining the locked state is provided as a separate member, or the like, the number of parts can be reduced, management of the number of parts is facilitated, and the parts costs can be reduced. Further, by reducing the number of parts, the assembly of the respective parts is facilitated, and thus, the assembly costs can also be reduced.

Due to the lock member 318 exhibiting elastic force in the directions of making the rotating portions 386 move away from one another in the vertical direction, the state in which the pivot pins 390 are inserted in the pivot holes 388 is maintained, and the lock member 318 is reliably held at the case members 314 (the case 330). Accordingly, in order to hold the lock member 318, there is no need to, for example, provide a member at the distal end of the pivot pin 390 for preventing pulling-out, or to caulk the distal end of the pivot pin 390. Thus, the number of parts does not increase, and assembly does not become difficult.

Moreover, due to the spring portion 384 provided at the center of the lock member 318, the lock member 318 can exhibit both elastic force for rotating the rotating portions 386 in the locking directions, and elastic force for holding the lock member 318 at the two case members 314. In this way, two elastic forces having different functions can be exhibited by the single spring portion 384. Thus, the number of parts can be reduced as compared with a structure in which respective members for exhibiting these elastic forces are provided separately.

In a case in which a small-sized medium is used as the disk medium 322, it is preferable to make the case members 314, the shutter members 316, the lock member 318, and the spring member 320 small-sized in accordance with the small size of the disk medium 322. These respective members can be easily assembled even when they are made to be small-sized. With regard to the lock member 318 in particular, by being provided as an integral member at the center as in the present embodiment, the lock member 318 can be made to be substantially larger than in a structure in which a lock member is provided separately for each of the two shutter members 316. Therefore, assembly of the lock member 318 is easy. For example, in the disk cartridge 312 of the present embodiment, even when the length of the longest side of the case member 314 is about 30 mm to 40 mm or even smaller than that, assembly of the respective members is not difficult.

In the disk cartridge of the present invention, the materials of the respective members are not particularly limited provided that they have the required properties. For example, by forming the case members 314 of resin, both maintaining of strength and lightening of weight can be achieved. In contrast, by forming the shutter members 316 and the lock member 318 of metal, the strength can be improved. Moreover, if the spring member 320 as well is formed of metal, a predetermined elasticity can be easily obtained.

In particular, at the lock member 318, by setting the width, the length of connection (essentially, the length of the plate member forming the spring portion 384), the thickness, and the like of the spring portion 384 to fall within appropriate, predetermined ranges, the elastic force can be made to be within a desired range. Note that, if the thickness of the spring portion 384 is changed, the vertical direction interval D1 between the rotating portions 386 is also changed. However, in the direction orthogonal thereto, the projection-shaped locking convex portions 392 engage with the locking concave portions 394 (and engagement thereof is released). Thus, even if the interval D1 is changed, there is no effect on the engagement of the locking convex portions 392 and the locking concave portions 394.

The disk medium 322 relating to the present invention is not particularly limited provided that information can be written thereon and read therefrom. For example, a medium employing any of various types of recording methods, such as recording of information by light, or recording of information by magnetism, or the like, can be utilized.

Because the present invention has the above-described structure, the two shutter members can each reliably be locked with a small number of parts. In particular, the two shutter members can each reliably be locked with a small number of parts even if the disk medium is small-sized.

What is claimed is:

1. A disk cartridge comprising:

a medium;

a pair of shells each having an access opening through which the medium can be accessed, and the pair of shells have substantially the same structure, and due to the pair of shells being superposed, a cartridge main body, which can accommodate the medium in an interior of the cartridge main body, is formed; and a pair of shutter members mounted correspondingly to the pair of shells, and able to independently move between an open position for opening the access openings and a closed position for closing the access openings, the pair of shutter members each having a shutter operation portion for externally operating the shutter member to move to the open position, wherein the shutter operation portion of each shutter member is positioned such that the shutter operation portion does not obstruct access to the medium via the access opening, whether the shutter member is positioned at the closed position or at the open position.

2. The disk cartridge of claim 1, wherein the cartridge main body has a rectangular configuration having four corner portions, and one side surface of the cartridge main body forms an access surface for external access to both shutter operation portions.

3. The disk cartridge of claim 2, wherein each shutter operation portion is disposed near a distal end of the access opening.

4. The disk cartridge of claim 2, wherein each shutter member can slide along a longitudinal direction of the access surface, in order to open and close the access opening.

5. The disk cartridge of claim 1, further comprising a spring member, the spring member having a pair of urging portions, each urging portion always urging a corresponding shutter member to the closed position.

6. A disk cartridge comprising:

a medium;

a pair of shells each having an access opening through which the medium can be accessed, and the pair of shells have substantially the same structure, and due to the pair of shells being superposed, a cartridge main body, which can accommodate the medium in an interior of the cartridge main body, is formed; and a pair of shutter members mounted correspondingly to the pair of shells, and able to move between an open position for opening the access openings and a closed position for closing the access openings, the pair of shutter members each having a shutter operation portion for externally operating the shutter member to move to the open position, wherein the shutter operation portion of each shutter member is positioned such that the shutter operation portion does not obstruct access to the medium via the access opening, whether the shutter member is positioned at the closed position or at the open position, and wherein each shutter member has a shutter main body portion and a shutter guide portion extending from one end side of the shutter main body portion, and is formed in an L-shape as seen in plan view, and the shutter operation portion is provided at a free end of the shutter guide portion.

7. A disk cartridge comprising:

a medium;

a pair of shells each having an access opening through which the medium can be accessed, and the pair of shells have substantially the same structure, and due to the pair of shells being superposed, a cartridge main body, which can accommodate the medium in an interior of the cartridge main body, is formed; and a pair of shutter members mounted correspondingly to the pair of shells, and able to move between an open position for opening the access openings and a closed position for closing the access openings, the pair of shutter members each having a shutter operation portion for externally operating the shutter member to move to the open position.

wherein the shutter operation portion of each shutter member is positioned such that the shutter operation portion does not obstruct access to the medium via the access opening, whether the shutter member is positioned at the closed position or at the open position, wherein each shutter member has a shutter main body portion and a shutter guide portion extending from one end side of the shutter main body portion, and is formed in an L-shape as seen in plan view, and the shutter operation portion is provided at a free end of the shutter guide portion, and wherein the cartridge main body includes a guide groove having a center line, and the distal end of the shutter operation portion traverses the center line of the guide groove.

8. A disk cartridge comprising:

a medium;

a pair of shells each having an access opening through which the medium can be accessed, and the pair of shells have substantially the same structure, and due to the pair of shells being superposed, a cartridge main body, which can accommodate the medium in an interior of the cartridge main body, is formed; and a pair of shutter members mounted correspondingly to the pair of shells, and able to move between an open position for opening the access openings and a closed position for closing the access openings, the pair of shutter members each having a shutter operation portion for externally operating the shutter member to move to the open position, wherein the shutter operation portion of each shutter member is positioned such that the shutter operation portion does not obstruct access to the medium via the access opening, whether the shutter member is positioned at the closed position or at the open position, wherein the cartridge main body has a rectangular configuration having four corner portions, and one side surface of the cartridge main body forms an access surface for external access to both shutter operation portions, wherein each shutter member can slide along a longitudinal direction of the access surface, in order to open and close the access opening, and wherein the access surface includes a guide groove having taper surfaces.

9. A disk cartridge comprising:

a medium;

a pair of shells each having an access opening through which the medium can be accessed, and the pair of shells have substantially the same structure, and due to the pair of shells being superposed, a cartridge main body, which can accommodate the medium in an interior of the cartridge main body, is formed;

a pair of shutter members mounted correspondingly to the pair of shells, and able to move between an open position for opening the access openings and a closed position for closing the access openings, the pair of shutter members each having a shutter operation portion for externally operating the shutter member to move to the open position, wherein the shutter operation portion of each shutter member is positioned such that the shutter operation portion does not obstruct access to the medium via the access opening, whether the shutter member is positioned at the closed position or at the open position; and a lock member, the lock member having a pair of moving portions and an elastic portion which elastically connects the moving portions, wherein each moving portion is movable between an engaging position, at which the moving portion engages with a corresponding shutter member positioned at the closed position and fixes the corresponding shutter member, and a non-engaging position, at which fixing is cancelled, and the elastic portion always urges each moving portion to the engaging position.

* * * * *